United States Patent [19]

Oyama et al.

[11] Patent Number: 5,463,568
[45] Date of Patent: Oct. 31, 1995

[54] METHOD AND APPARATUS FOR MEASURING A DISTANCE OF A ROUTE IN A SOLID FIGURE

[75] Inventors: Takamasa Oyama, Kawasaki; Masao Kato, Yokohama; Michio Miwa, Tokyo, all of Japan

[73] Assignee: Matsushita Electric Industrial Co., Ltd., Osaka, Japan

[21] Appl. No.: 155,885

[22] Filed: Nov. 23, 1993

[30] Foreign Application Priority Data

Nov. 26, 1992  [JP]  Japan ................... 4-337784

[51] Int. Cl.$^6$ ................................. G01B 7/28
[52] U.S. Cl. ............... 364/561; 364/474.36; 364/551.02; 364/468; 364/559; 395/119; 395/120; 395/127; 395/147
[58] Field of Search ................. 364/474.34, 474.36, 364/474.24, 474.37, 551.02, 468, 561, 559, 562; 395/119, 127, 120, 161, 143, 142, 147, 141, 919–921, 155

[56] References Cited

U.S. PATENT DOCUMENTS

| | | | |
|---|---|---|---|
| 4,845,643 | 7/1989 | Clapp | 395/127 |
| 4,901,250 | 2/1990 | Ishida | 395/155 |
| 4,945,498 | 7/1990 | Mitamura | 395/141 |
| 5,208,763 | 5/1993 | Hong et al. | 364/551.02 |
| 5,272,642 | 12/1993 | Suzuki | 364/474.24 |
| 5,297,254 | 3/1994 | Arai et al. | 395/143 |

FOREIGN PATENT DOCUMENTS

| | | |
|---|---|---|
| 1138137 | 9/1989 | Japan . |
| 3105568 | 5/1991 | Japan . |

Primary Examiner—Ellis B. Ramirez
Assistant Examiner—Hal D. Wachsman
Attorney, Agent, or Firm—Lowe, Price, LeBlanc & Becker

[57] ABSTRACT

An apparatus for measuring a figure distance between first and second points of a solid figure with a measuring device having first and second panels and an axis connecting the panels is provided with a measuring device data storing section for storing attribute data and constitutional data of the measuring device, a solid figure data storing section for storing solid figure data, and a display section for displaying the measuring device and the solid figure according to the data stored in the storing sections, a moving section for positioning the first and second panels at the first and second points according to a motion mode, and a renewing section for renewing the data according to an editing mode. In the moving section, the axis is extended or shortened, translation movement is performed for the measuring device, and/or the panels is deformed in a stick shape according to the motion mode. In the renewing section, the measuring device is rotated or jointed to a second measuring device, one of the panels is overlapped with a surface or an edge of the solid figure, and/or the axis is curved to measure a curved outline length of the solid figure according to the editing mode.

21 Claims, 28 Drawing Sheets

FIG. 4A
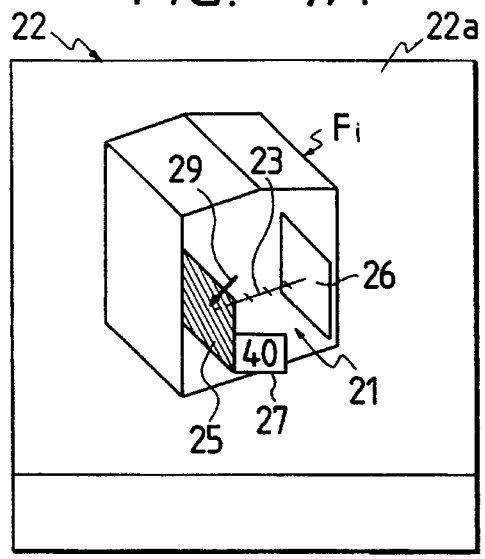
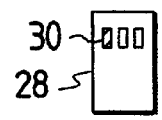
FIG. 4B
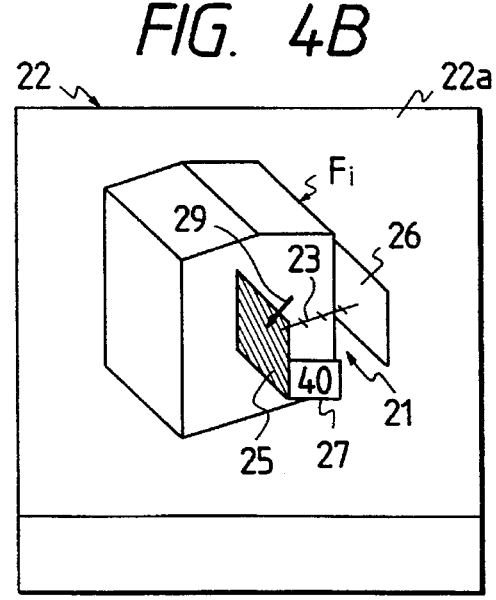
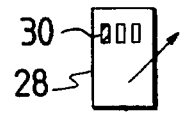
FIG. 4C
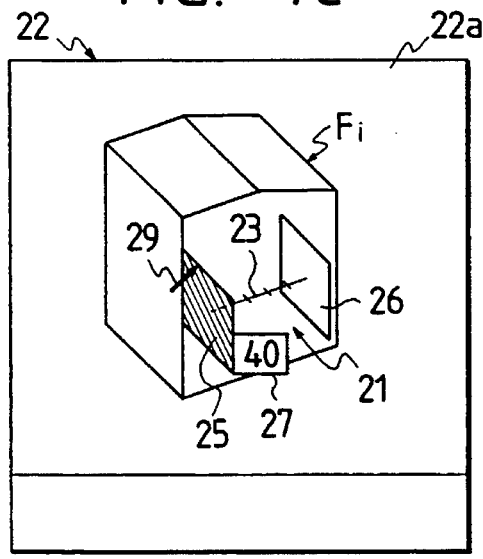
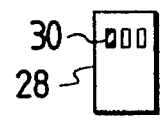
FIG. 4D
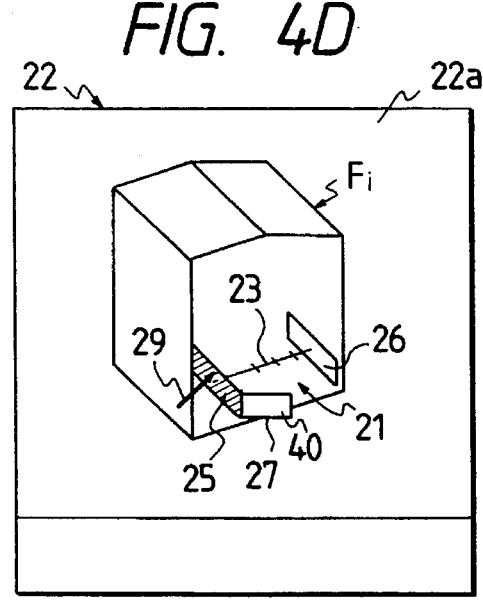
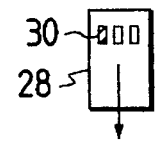

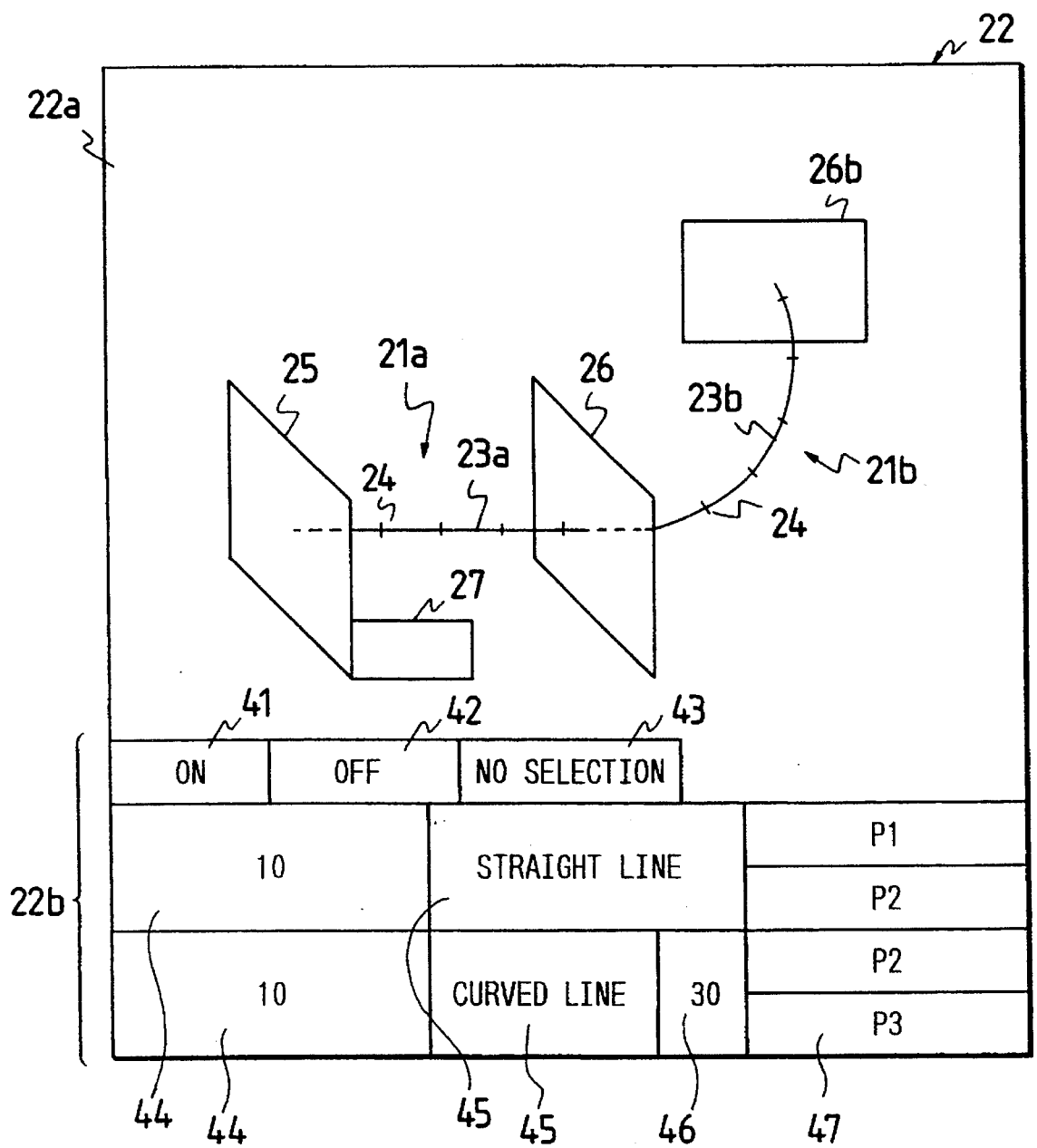

FIG. 6A
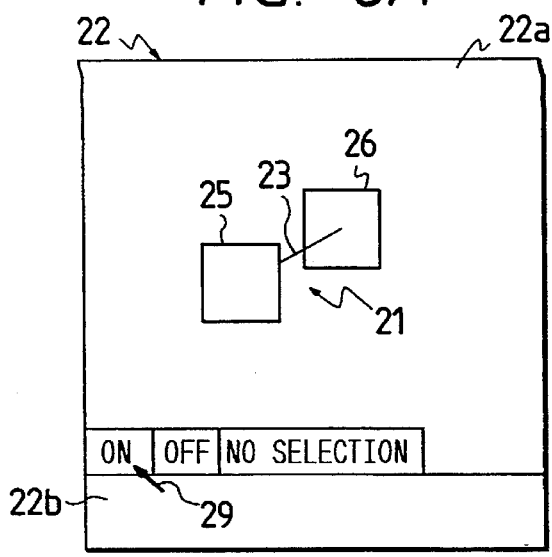
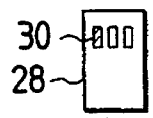
FIG. 6C
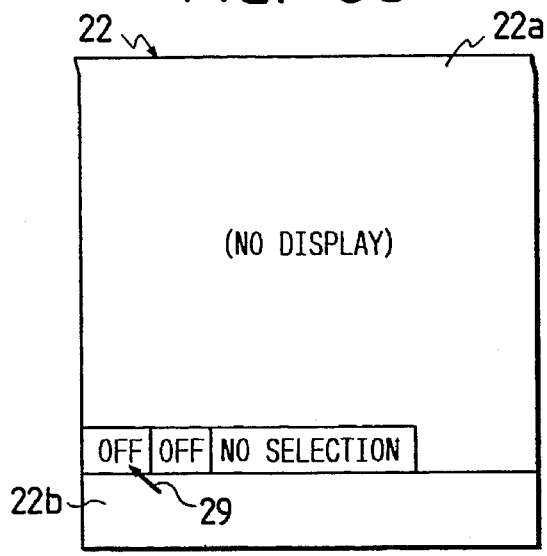
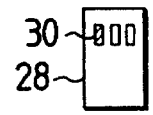
FIG. 6B
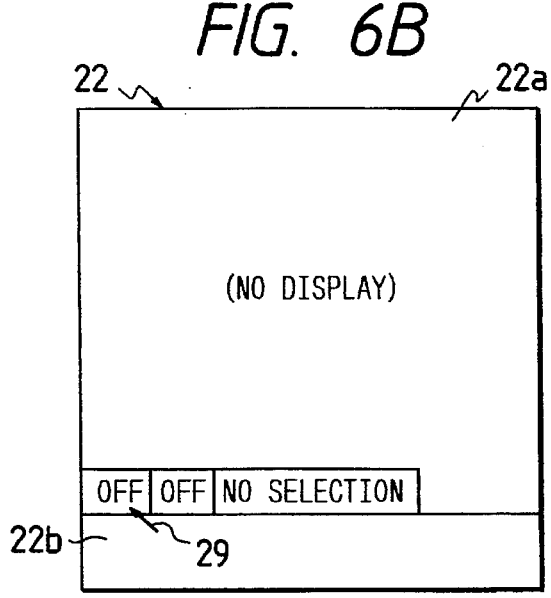
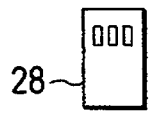
FIG. 6D
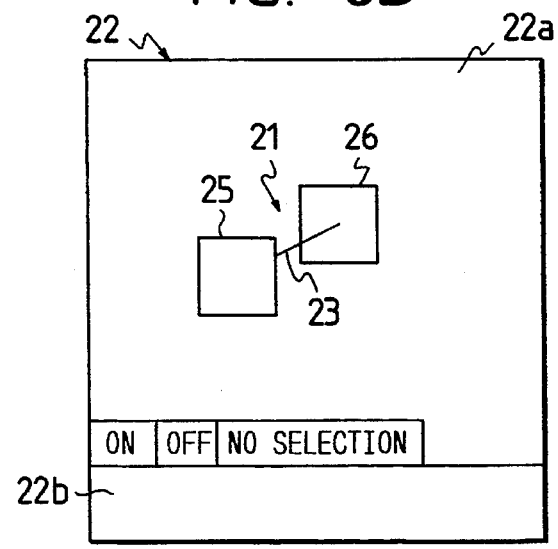
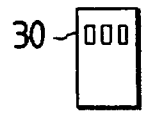

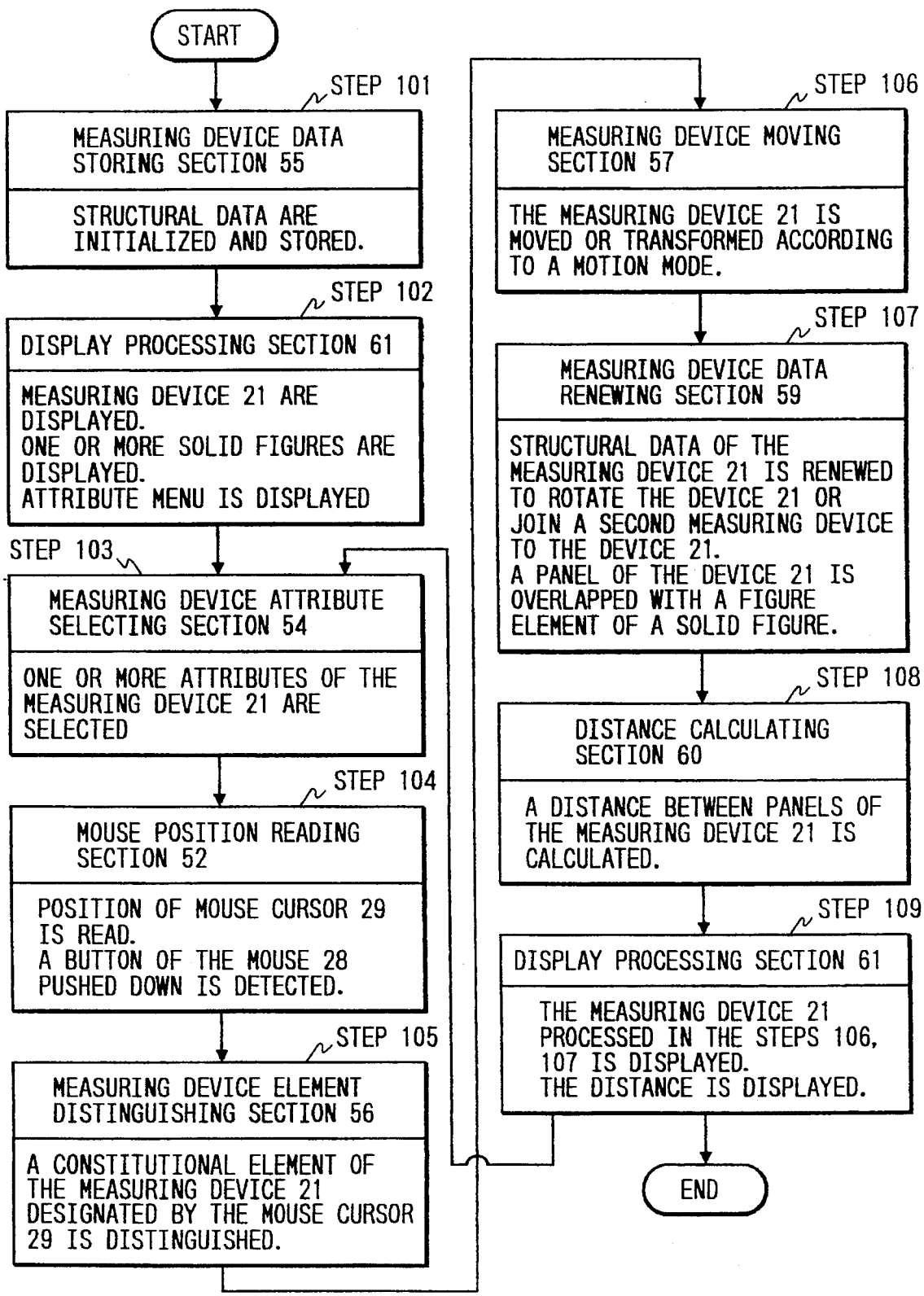

FIG. 9

| FIGURE ELEMENT | THE NUMBER OF THE FIGURE ELEMENT | POSITIONAL COORDINATES OF THE FIGURE ELEMENT |
|---|---|---|
| VERTEX | VERT 1 | $(x_1, y_1, z_1)$ |
| VERTEX | VERT 2 | $(x_2, y_2, z_2)$ |
| ⋮ | ⋮ | ⋮ |
| VERTEX | VERT n | $(x_n, y_n, z_n)$ |
| SURFACE | SURF 1 | $(x_{11}, y_{11}, z_{11}), \cdots (x_{1j}, y_{1j}, z_{1j})$ |
| SURFACE | SURF 2 | $(x_{21}, y_{21}, z_{21}), \cdots (x_{2j}, y_{2j}, z_{2j})$ |
| ⋮ | ⋮ | ⋮ |
| SURFACE | SURF m | $(x_{m1}, y_{m1}, z_{m1}), \cdots (x_{mj}, y_{mj}, z_{mj})$ |

FIG. 10B

AXIS INFORMATION

| $A_{x1}$ | P1 | PANEL 2 | $(x_{g1}, y_{g1}, z_{g1})$ | $(x_{g2}, y_{g2}, z_{g2})$ |
|---|---|---|---|---|
| $A_{x2}$ | P2 | PANEL 3 | $(x_{g2}, y_{g2}, z_{g2})$ | $(x_{g3}, y_{g3}, z_{g3})$ |

PANEL INFORMATION

| P1 | 100 | 100 | $(x_{g1}, y_{g1}, z_{g1})$ | $(u, v, w)$ |
|---|---|---|---|---|
| | | | | |
| P2 | 100 | 100 | $(x_{g2}, y_{g2}, z_{g2})$ | $(u, v, w)$ |
| | | | | |
| P3 | 100 | 100 | $(x_{g3}, y_{g3}, z_{g3})$ | $(u, v, w)$ |
| | | | | |

SCALE INFORMATION

| $A_{x1}$ | $(x_{g1}, y_{g1}, z_{g1}), (x_{g1+10}, y_{g1+10}, z_{g1+10}), \cdots, (x_{g2}, y_{g2}, z_{g2})$ |
|---|---|
| $A_{x2}$ | $(x_{g2}, y_{g2}, z_{g2}), (x_{g2+10}, y_{g2+10}, z_{g2+10}), \cdots, (x_{g3}, y_{g3}, z_{g3})$ |

ATTRIBUTE INFORMATION

| STRAIGHT LINE | 0 | 10 | 1 | 2 |
|---|---|---|---|---|
| CURVED LINE | 10 | 10 | 2 | 3 |

FIG. 10A

AXIS INFORMATION

| THE NUMBER OF THE CONNECTING AXIS | THE NUMBERS OF THE PANELS CONNECTED TO THE AXIS | COORDINATE DATA OF ENDS OF THE AXIS | POSITIONAL DATA OF THE AXIS |
|---|---|---|---|

PANEL INFORMATION

| THE NUMBER OF THE PANEL | LENGTH OF THE PANEL | WIDTH OF THE PANEL | GRAVITY CENTER COORDINATES OF THE PANEL | COMPONENTS OF A NORMAL VECTOR OF THE PANEL |
|---|---|---|---|---|

| THE NUMBER OF THE FIGURE ELEMENT | POSITIONAL COORDINATES OF THE FIGURE ELEMENT |
|---|---|

SCALE INFORMATION

| THE NUMBER OF THE CONNECTING AXIS | COORDINATE DATA OF SCALE MARKS |
|---|---|

MEASURED DISTANCE INFORMATION

| PANEL DISTANCE | CHANGING DEGREE OF THE PANEL DISTANCE |
|---|---|

DISTANCE DISPLAY WINDOW INFORMATION

| LENGTH OF THE WINDOW | WIDTH OF THE WINDOW | POSITIONAL COORDINATES OF THE WINDOW | THE NUMBER OF THE PANELS ATTACHED TO THE WINDOW |
|---|---|---|---|

ATTRIBUTE INFORMATION

| DISPLAY MODE | BINDING MODE | EDITING MODE |
|---|---|---|

INFORMATION OF THE CONNECTING AXIS

| AXIAL TYPE | CURVATURE DATA | SCALE DATA | THE NUMBER OF THE FIRST PANEL | THE NUMBER OF THE SECOND PANEL |
|---|---|---|---|---|

SHAPE DATA OF PANEL INFORMATION

| P1 | 100 | 100 | (50, 50, 50) | (1, 2, -1) |
|---|---|---|---|---|
| | P1 | $(x_1, y_1, z_1)$ ...... $(x_4, y_4, z_4)$ | | |
| | EDGE 1 | $(x_1, y_1, z_1)$ | $(x_2, y_2, z_2)$ | |
| | EDGE 2 | $(x_2, y_2, z_2)$ | $(x_3, y_3, z_3)$ | |
| | EDGE 3 | $(x_3, y_3, z_3)$ | $(x_4, y_4, z_4)$ | |
| | EDGE 4 | $(x_4, y_4, z_4)$ | $(x_1, y_1, z_1)$ | |
| P2 | 100 | 100 | (150, 150, 150) | (1, 2, -1) |
| | P2 | $(x_5, y_5, z_5)$ ...... $(x_8, y_8, z_8)$ | | |
| | EDGE 5 | $(x_5, y_5, z_5)$ | $(x_6, y_6, z_6)$ | |
| | EDGE 6 | $(x_6, y_6, z_6)$ | $(x_7, y_7, z_7)$ | |
| | EDGE 7 | $(x_7, y_7, z_7)$ | $(x_8, y_8, z_8)$ | |
| | EDGE 8 | $(x_8, y_8, z_8)$ | $(x_5, y_5, z_5)$ | |

| $100\sqrt{3}$ | 0 |
|---|---|

| ON | OFF | NO SELECTION | |
|---|---|---|---|
| | 0 | 10 | |
| | | | |

FIG. 13

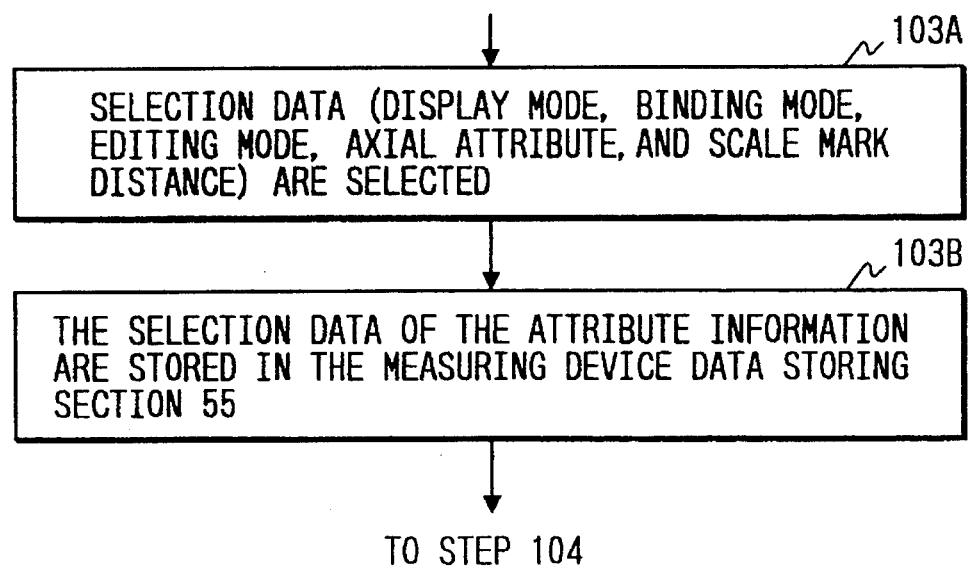

FROM STEP 102

↓

103A — SELECTION DATA (DISPLAY MODE, BINDING MODE, EDITING MODE, AXIAL ATTRIBUTE, AND SCALE MARK DISTANCE) ARE SELECTED

↓

103B — THE SELECTION DATA OF THE ATTRIBUTE INFORMATION ARE STORED IN THE MEASURING DEVICE DATA STORING SECTION 55

↓

TO STEP 104

FIG. 14

TYPES OF SELECTION DATA OF THE ATTRIBUTE INFORMATION

DISPLAY MODE = {ON, OFF}

BINDING MODE = {ON, OFF}

EDITING MODE = {ROTATION, JOINING, ELIMINATION, NO SELECTION}

AXIAL TYPE DATA = {STRAIGHT LINE, CURVED LINE}

CURVATURE DATA = {±10, ±20, ±30, ±40, ···, ±100}
          (AXIAL TYPE DATA = CURVED LINE)

SCALE DATA = {10, 20, ···, 100}

THE NUMBER OF THE PANEL = {P1, P2, P3, ··· }

FIG. 15A

| MOUSE INFORMATION | | | |
|---|---|---|---|
| CURRENT COORDINATES OF THE MOUSE CURSOR 29 | CURRENT CONDITION OF THE MOUSE 28 | MOUSE BUTTON CURRENTLY OPERATED | |
| PREVIOUS COORDINATES OF THE MOUSE CURSOR 29 | PREVIOUS CONDITION OF THE MOUSE 28 | | |
| MOTION MESSAGE | | | |
| MOTION MODE | CONSTITUTIONAL ELEMENT OF MEASURING DEVICE 21 | | |

CONDITION OF MOUSE = {OFF, ON}
MOUSE BUTTON = {LEFT, CENTRAL, RIGHT, NOTHING}
MOTION MODE = {EXTENSION OF AXIS, SHORTENING OF AXIS, ELEMENT DESIGNATION OF FIGURE, TRANSLATION MOVEMENT, TRANSFORMATION, NO MOTION}

FIG. 15B

| MOUSE INFORMATION | | |
|---|---|---|
| (0, 0) | OFF | NOTHING |
| (0, 0) | OFF | |
| MOTION MESSAGE | | |
| NO SELECTION | NOTHING | |

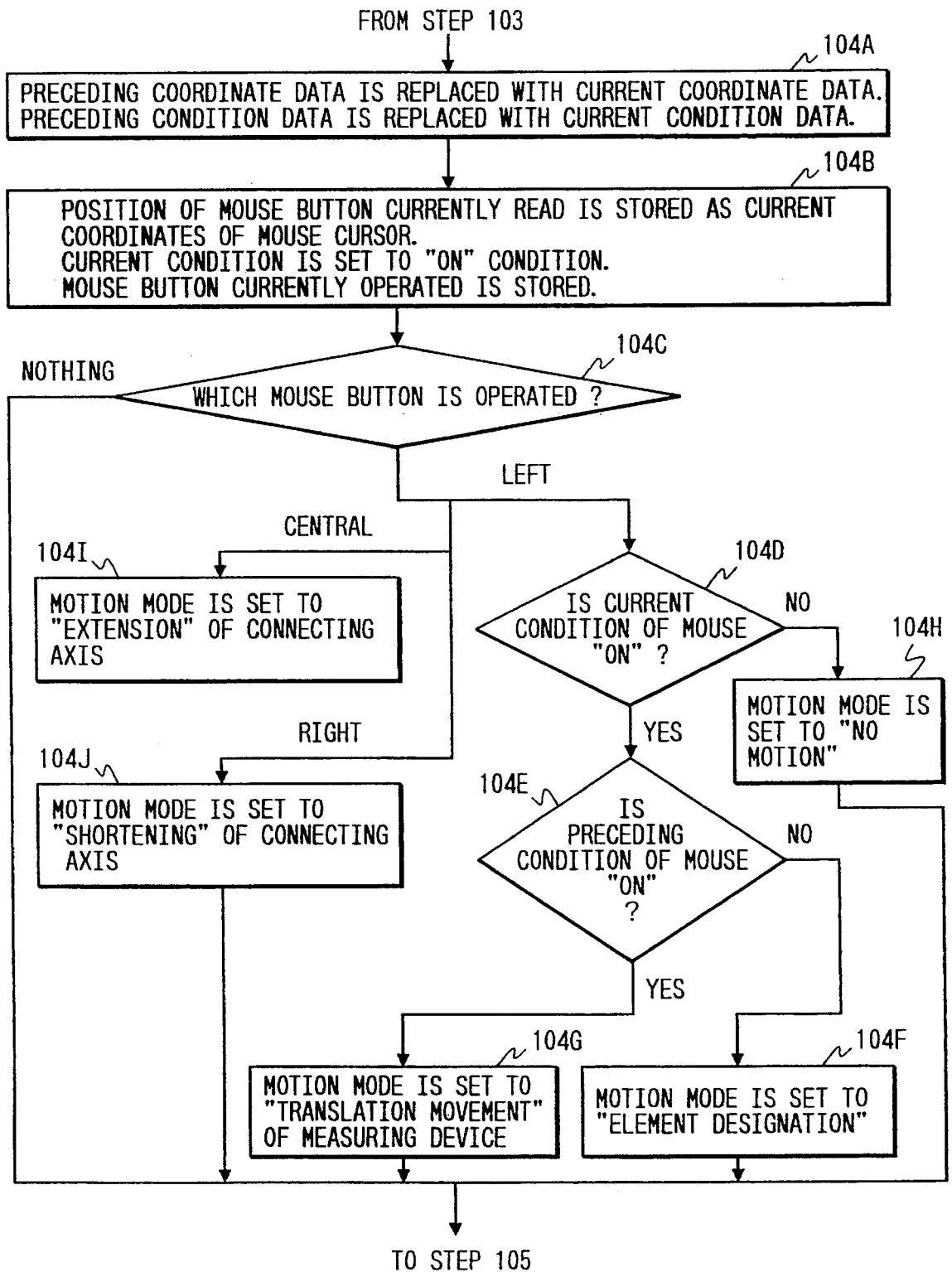

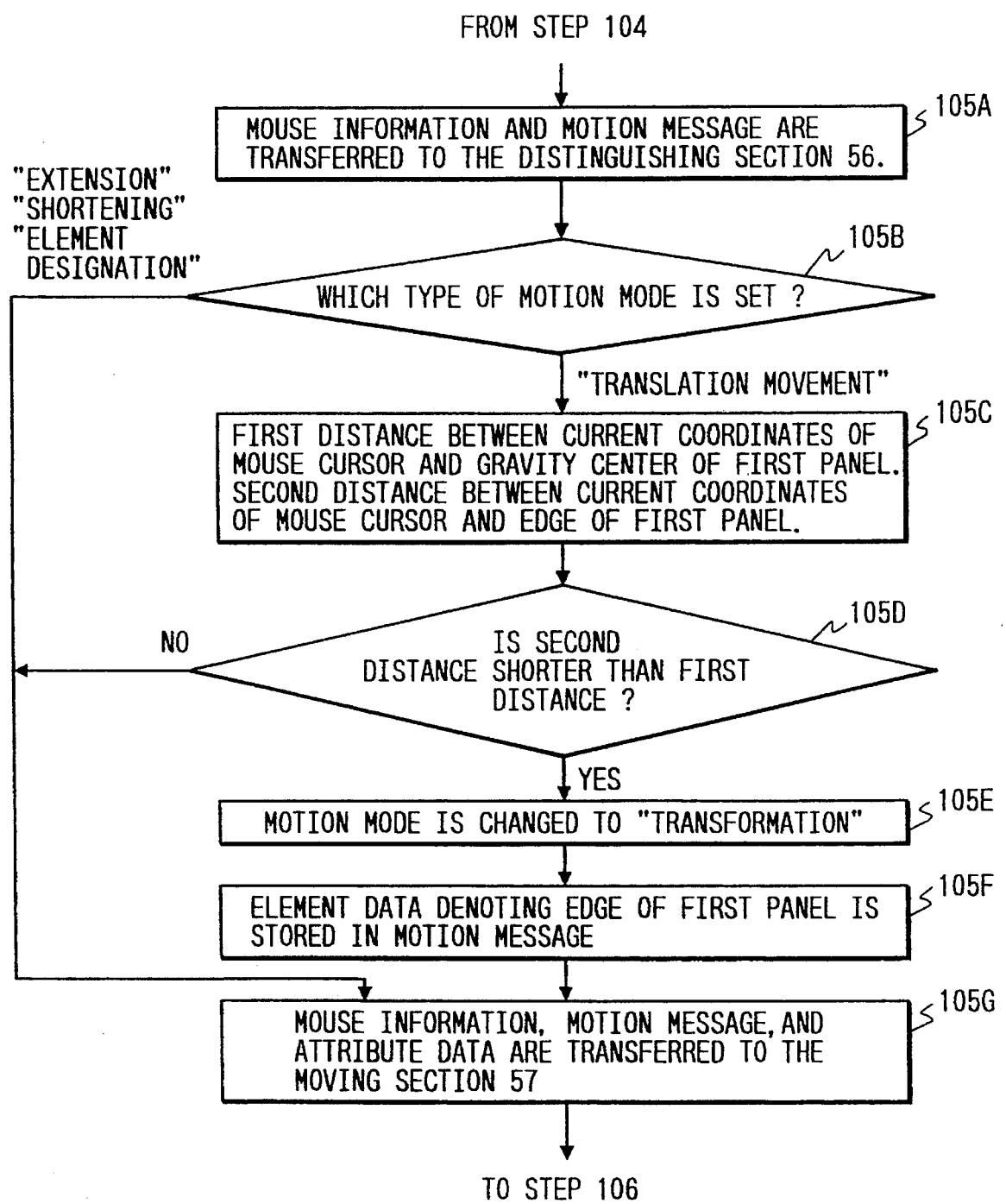

FIG. 22A
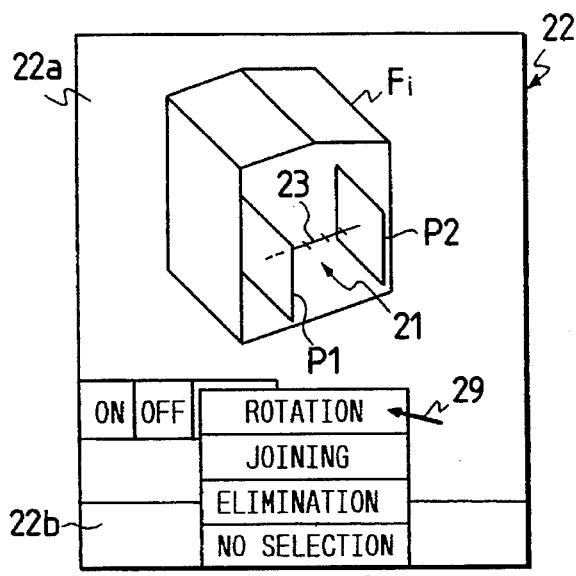
FIG. 22B
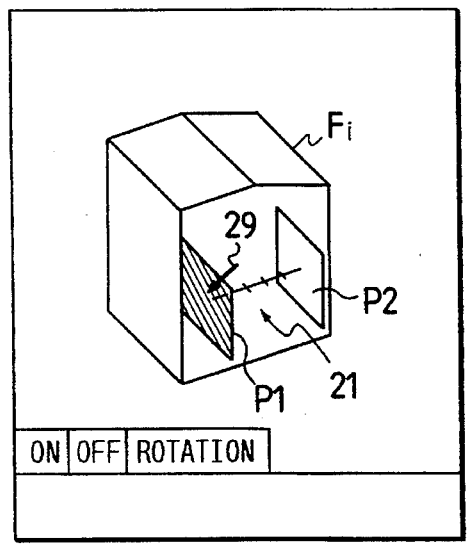
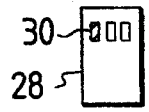
FIG. 22C
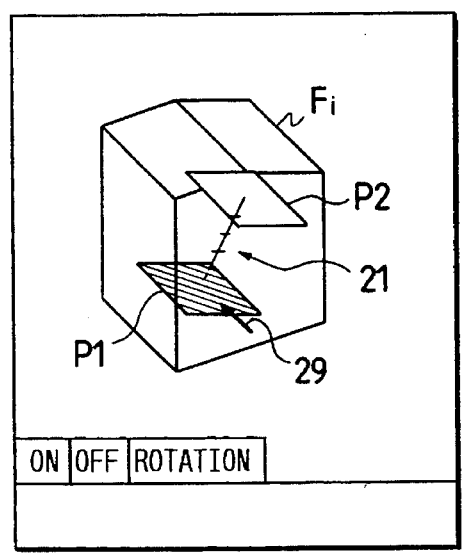
FIG. 22D
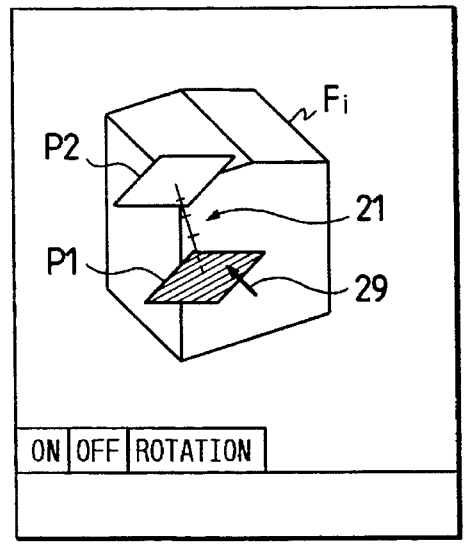
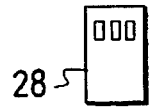

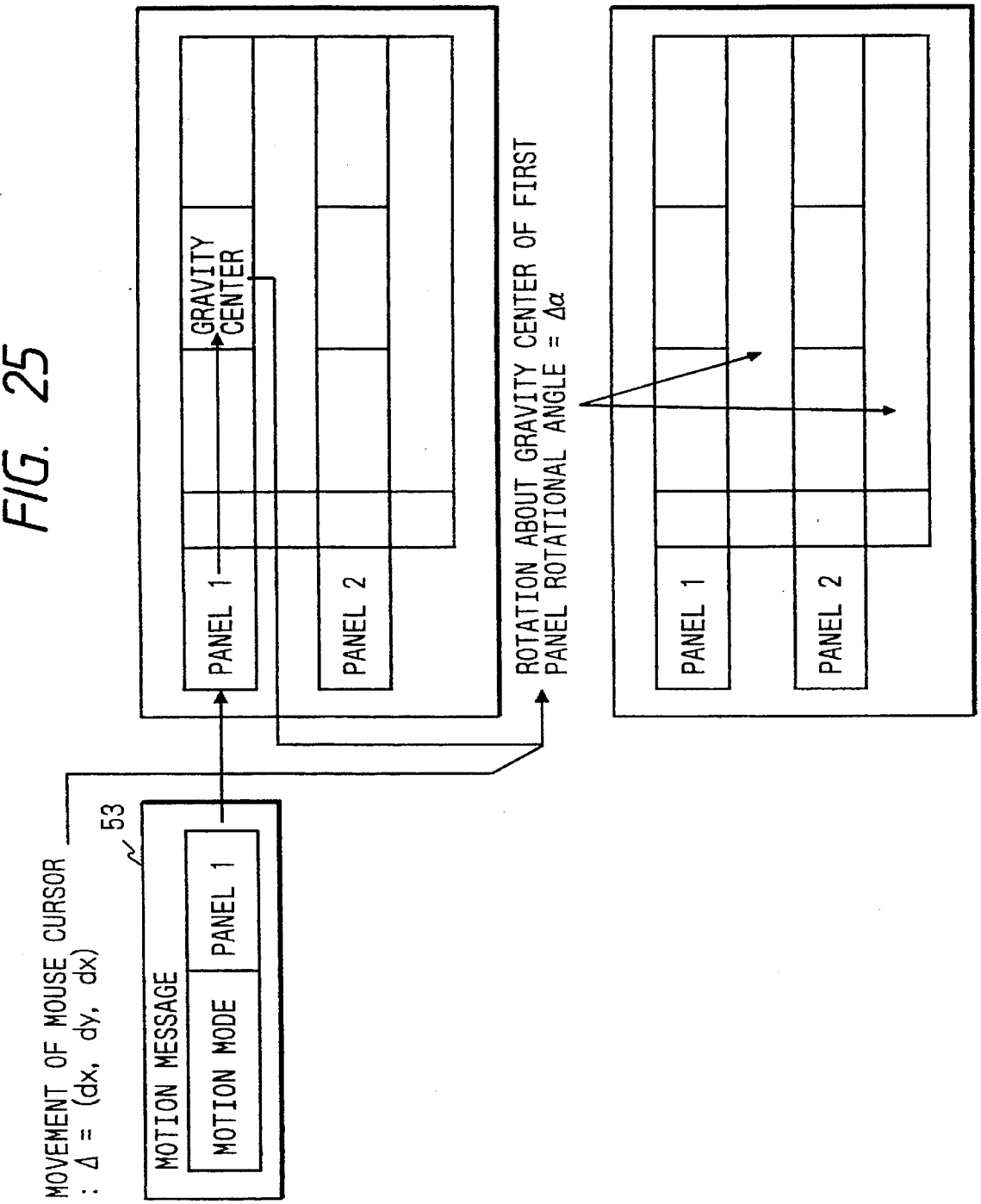

| PANEL INFORMATION | | | | |
|---|---|---|---|---|
| P1 | 100 | 100 | $(x_{g1}, y_{g1}, z_{g1})$ | $(u, v, w)$ |
| | P1 | $(x_1, y_1, z_1)$ | ...... | |
| P2 | 100 | 100 | $(x_{g2}, y_{g2}, z_{g2})$ | $(u, v, w)$ |
| | P2 | $(x_2, y_2, z_2)$ | ...... | |

} 52

ATTRIBUTE INFORMATION

| STRAIGHT LINE | 0 | 10 | P1 | P2 |
|---|---|---|---|---|
| 0 | 0 | 0 | 0 | 0 |

↓ EDITING MODE "JOINING"   ↑ EDITING MODE "ELIMINATION"

55

| PANEL INFORMATION | | | | |
|---|---|---|---|---|
| P1 | 100 | 100 | $(x_{g1}, y_{g1}, z_{g1})$ | $(u, v, w)$ |
| | P1 | $(x_1, y_1, z_1)$ | ...... | |
| P2 | 100 | 100 | $(x_{g2}, y_{g2}, z_{g2})$ | $(u, v, w)$ |
| | P2 | $(x_2, y_2, z_2)$ | ...... | |
| P3 | 100 | 100 | $(x_{g3}, y_{g3}, z_{g3})$ | $(u, v, w)$ |
| | P3 | $(x_3, y_3, z_3)$ | ...... | |

ATTRIBUTE INFORMATION

| STRAIGHT LINE | 0 | 10 | P1 | P2 |
|---|---|---|---|---|
| STRAIGHT LINE | 0 | 10 | P2 | P3 |

METHOD AND APPARATUS FOR MEASURING A DISTANCE OF A ROUTE IN A SOLID FIGURE

BACKGROUND OF THE INVENTION

1. Field of the Invention

The present invention relates generally to method and apparatus for measuring and displaying a distance between surfaces or edges of one or more solid figures displayed in a displaying unit in a three-dimensional space, and more particularly to method and apparatus for measuring and displaying a distance of a route in one or more solid figures in a simple operation even though shapes of the solid figures are complicated.

2. Description of the Related Art

Various solid figures are drawn in a three-dimensional space by utilizing a computer aided graphic design apparatus to display those solid figures in a display screen. In this case, it is required to measure a distance between surfaces of solid figures facing each other, a distance between edges of the solid figures or a distance between vertexes of the solid figures for the purpose of determining all actual distance between the solid figures drawn in the display screen. For example, various types of figure elements such as a surface, an edge and a vertex are prepared for each of the solid figures to measure the distance in the three-dimensional space in the computer aided graphic design apparatus, and an operator selects one of types of figure elements in each of measured solid figures with a mouse. Thereafter, a distance between the selected type of figure element of a first measured figure and the selected type of figure element of a second measured figure is calculated and displayed in the display screen.

2.1. Previously Proposed Art

A conventional apparatus for measuring a distance between solid figures displayed in a display screen is described with reference to FIG. 1.

FIG. 1 is a block diagram of a conventional distance measuring apparatus for measuring a distance between solid figures.

As shown in FIG. 1, a conventional distance measuring apparatus 11 is provided with a mouse input information reading section 12 for reading a type of figure element displayed in a figure element menu region of a display screen with a mouse cursor moved by an operator and a position of the mouse cursor designating a figure element displayed in a figure display region of the display screen, a solid figure data storing section 13 for storing pieces of solid figure data denoting shapes of a plurality of solid figures and pieces of solid figure element data denoting shapes of figure elements of each of the solid figures which are displayed in the figure display region, a figure element type storing section 14 for storing the type of figure element read in the reading section 12, and a figure element distinguishing section 15 for distinguishing a figure element from the figure elements displayed in the figure display region of which the figure element data are transferred from the storing section 13. A type of the figure element distinguished in the distinguishing section 15 is the same as the type of figure element stored in the storing section 14, and the figure element distinguished is displayed near the position read in the reading section 12.

The apparatus 11 is further provided with a distance calculating section 16 for calculating a distance between the figure elements of figures facing each other which are distinguished in the distinguishing section 15 one after another, and a display processing section 17 for displaying the distance calculated in the calculating section 16 in the figure display region and emphatically displaying the figure elements distinguished in the distinguishing section 15.

In the above configuration, a distance between a first figure element E1 of a first solid figure F1 and a second figure element E2 of a second solid figure F1 is measured. Initially, types of the first and second figure elements E1, E2 are read in the mouse input information reading section 12. In detail, as shown in FIG. 2A, the first and second solid figures F1, F2 stored in the solid figure storing section 13 are displayed in the figure display region as an initial image with a figure element menu displayed in the figure element menu region. The figure element menu is composed of a first figure element selecting section 20a and a second figure element selecting section 20b. In each of the selecting sections, various types of figure elements such as "surface", "edge" and "vertex" are prepared. Therefore, an operator operates a mouse cursor Cm of a mouse 18 to designate a type of a first figure element in the first figure element section 20a, and the operator pushes a left mouse button 19 of the mouse 18 to read the type of the first figure element in the reading section 12. Thereafter, as shown in FIG. 2B, the operator operates the mouse cursor Cm to designate a type of a second figure element in the second figure element section 20b, and the operator pushes the left mouse button 19 to read the type of the second figure element in the reading section 12. The types of the first and second figure elements read in the reading section 12 are stored in the figure element type storing section 14.

Thereafter, as shown in FIG. 2C, the operator moves the mouse cursor Cm toward the figure display region to position the mouse cursor Cm near the first figure element E1 of the first solid figure F1, and the operator pushes the left mouse button 19. Therefore, the position of the mouse cursor Cm is read in the reading section 12 and is transferred to the figure element distinguishing section 15. In the distinguishing section 15, because the first figure element E1 is arranged at a position nearest to the mouse cursor Cm among the figure elements of the same type as that of the first figure element stored in the storing section 14, the first figure element E1 is distinguished from the figure elements of the first solid figure F1 of which the data are stored in the storing section 13. Thereafter, the first figure element E1 distinguished is emphatically displayed in the figure display region by the function of the display processing section 17. Also, the first figure element E1 distinguished is transferred to the distance calculating section 16.

Thereafter, as shown in FIG. 2D, the operator moves the mouse cursor Cm near the second figure element E2 of the second solid figure F2, and the operator pushes the left mouse button 19. Therefore, the position of the mouse cursor Cm is read in the reading section 12 and is transferred to the figure element distinguishing section 15. In the distinguishing section 15, because the second figure element E2 is arranged at a position nearest to the mouse cursor Cm among the figure elements of the same type as that of the second figure element stored in the storing section 14, the second figure element E2 is distinguished from the figure elements of the second solid figure F2 of which the data are stored in the storing section 13. Thereafter, the second figure element E2 distinguished is emphatically displayed in the figure display region by the function of the display processing section 17. Thereafter, a distance between the first and second figure elements E1, E2 distinguished in the distinguishing section 15 is calculated in the distance calculating section 16, and the distance calculated is displayed in a distance display window Wd of the figure display region by the function of the display processing section 17.

Accordingly, because a first-stage operation in which types of figure elements of measured solid figures are designated in the figure element menu region in advance and a second-stage operation in which the figure elements of the measured solid figures are designated in the figure display region are performed by the operator in the conventional apparatus 11, a distance between the figure elements of the measured solid figures can be displayed in the figure display region.

2.2. Problems to be Solved by the Invention

However, because two types of operations are required of the operator in the conventional apparatus 11, it takes a lot of time to obtain the distance, and the operations are troublesome for the operator.

Also, because figure elements of solid figures designated by the mouse cursor Cm are necessarily required to determine a distance between two positions of the solid figures, the distance cannot be measured in cases where any figure element does not exist in the positions of the solid figures. Therefore, when an operator intends to draw solid figures while confirming a distance between two positions of the solid figures at which any figure element does not exist, the operator cannot utilize a distance measuring function of the conventional apparatus 11, so that the solid figures cannot be efficiently drawn.

In addition, a distance in a straight line is measured in the conventional apparatus 11, a distance of a curved line along a complicated curved outline of a solid figure cannot be measured in the conventional apparatus 11.

SUMMARY OF THE INVENTION

A first object of the present invention is to provide, with due consideration to the drawbacks of such a conventional distance measuring apparatus, a solid figure distance measuring apparatus in which a distance between first and second positions of one or more solid figures is immediately measured in a simple operation even though any figure element does not exist in the first or second position of the solid figures. Also, the first object is to provide the apparatus in which a distance of a curved line along a complicated curved outline of a solid figure is easily measured.

A second object of the present invention is to provide a method in which a distance between first and second positions of one or more solid figures is immediately measured in a simple operation even though any figure element does not exist in the first or second position of the solid figures. Also, the second object is to provide the method in which a distance of a curved line along a complicated curved outline of a solid figure is easily measured.

The first object is achieved by the provision of a solid figure distance measuring apparatus for measuring a figure distance between a first point of a solid figure and a second point of the solid figure in a three-dimensional space, comprising:

measuring device data storing means for storing pieces of structural data of a measuring device which include a piece of length data denoting a length of the measuring device and a piece of positional data denoting a position of the measuring device, the length of the measuring device being represented by an element distance between a first constitutional element of the measuring device and a second constitutional element of the measuring device;

solid figure data storing means for storing pieces of figure element data denoting shapes of a plurality of figure elements of the solid figure;

displaying means for displaying the solid figure in a display screen according to the figure element data stored in the solid figure data storing means and displaying the measuring device in the display screen according to the structural data stored in the measuring device data storing means;

measuring device positioning means for positioning the first constitutional element of the measuring device displayed by the displaying means at the first point of the solid figure displayed by the displaying means while changing the positional data stored in the measuring device data storing means;

measuring device extending or shortening means for extending or shortening the length of the measuring device, of which the first constitutional element is positioned at the first point by the measuring device positioning means, to set the second constitutional element of the measuring device displayed by the displaying means at the second point of the solid figure displayed by the displaying means while changing the length data stored in the measuring device data storing means; and figure distance calculating means for calculating the length of the measuring device which is extended or shortened in the measuring device extending or shortening means, the length of the measuring device calculated by the figure distance calculating means being displayed in the display screen by the display means as the figure distance.

In the above configuration, pieces of structural data of a measuring device are stored in the measuring device data storing means in advance. The structural data include a piece of length data denoting a length of the measuring device and a piece of positional data denoting a position of the measuring device. The length of the measuring device is defined as an element distance between first and second constitutional elements of the measuring device, and the second constitutional element is moved to extend or shorten the length of the measuring device when the length data is changed. Also, the position of the measuring device is represented by that of the first constitutional element of the measuring device. Therefore, the first constitutional element of the measuring device is positioned according to the positional data.

Also, pieces of figure element data denoting shapes of a plurality of figure elements of a solid figure are stored in the solid figure data storing in advance. Therefore, the solid figure is displayed in a display screen according to the figure element data, and the measuring device is displayed in the display screen according to the structural data of the measuring device.

In the present invention, a figure distance between first and second points of the solid figure is measured by calculating an element distance between the first constitutional element positioned at the first point and the second constitutional element positioned at the second point.

In detail, the positional data is changed in the measuring device positioning means to position the first constitutional element at the first point while an operator watches the measuring device and the solid figure displayed in the display screen. Thereafter, the length data is changed in the measuring device extending or shortening means to position the second constitutional element at the second point while extending or shortening the length of the measuring device. Thereafter, the length of the measuring device is calculated by the figure distance calculating means and is displayed in the display screen by the display means as the figure distance.

Accordingly, the figure distance can be immediately measured by positioning the first and second constitutional elements of the measuring device at the first and second points of the solid figure. Also, even though any figure element of the solid figure such as a surface, an edge or a vertex does not exist at the first or second point, the figure distance can be measured because the first and second constitutional elements of the measuring device can be moved to anywhere.

It is preferable that the measuring device be composed of a connecting axis, the first constitutional element consisting of a first flat panel which is connected to one end of the connecting axis, the second constitutional element consisting of a second flat panel which is connected to the other end of the connecting axis, and a distance display window in which the length of the measuring device calculated in the figure distance calculating means is numerically displayed as the figure distance. In the above configuration, the connecting axis is extended or shortened by the measuring device extending or shortening means to position the second constitutional element of the measuring device at the second point. Therefore, the element distance is equal to an axial length of the connecting axis so that the figure distance is represented by the axial length.

In addition, it is preferable that the apparatus additionally include axial curving means for curving the connecting axis of the measuring device, of which the first constitutional element is positioned at the first point of the solid figure by the measuring device positioning means and the second constitutional element is set at the second point of the solid figure by the measuring device extending or shortening means, along a curved outline of the solid surface.

In the above configuration, in cases where an outline of the solid surface positioned between the first and second points is curved, the measurement of the figure distance along the curved outline is required to draw the solid figure. In the present invention, the connecting axis of the measuring device is curved by the axial curving means along the curved outline of the solid figure after the first and second constitutional elements are positioned at the first and second points. Thereafter, a curved length of the connecting axis is calculated in the figure distance calculating means, and the curved length is displayed in the display screen by the display means as the figure distance. Therefore, even though the outline of the solid figure is complicated because the outline is curved, the figure distance can be easily measured.

The second object is achieved by the provision of a method for measuring a figure distance between a first point of a solid figure and a second point of the solid figure in a three-dimensional space, comprising the steps of:

storing pieces of structural data of a measuring device which include a piece of length data denoting a length of the measuring device and a piece of positional data denoting a position of the measuring device in a measuring device data storing section, the length of the measuring device being represented by an element distance between a first constitutional element of the measuring device and a second constitutional element of the measuring device;

storing pieces of figure element data denoting shapes of a plurality of figure elements of the solid figure in a figure element data storing section;

displaying the solid figure in a display screen according to the figure element data stored in the figure element data storing section;

displaying the measuring device in the display screen according to the structural data stored in the measuring device data storing section;

positioning the first constitutional element of the measuring device displayed in the display screen at the first point of the solid figure while changing the positional data stored in the measuring device data storing section;

extending or shortening the length of the measuring device to set the second constitutional element of the measuring device displayed in the display screen at the second point of the solid figure while changing the length data stored in the measuring device data storing section;

calculating the length of the measuring device; and displaying the length of the measuring device in the display screen as the figure distance.

In the above steps, pieces of structural data of the measuring device and pieces of figure element data are stored. Thereafter, the solid figure and the measuring device are displayed in the display screen. Thereafter, the first constitutional element of the measuring device is positioned at the first point of the solid figure while an operator watches a positional relationship between the measuring device and the solid figure displayed in the display screen. Thereafter, the second constitutional element of the measuring device is set at the second point by extending or shortening the length of the measuring device. As a result, the length of the measuring device represented by the element distance between the first and second constitutional elements agrees with the figure distance. Thereafter, the length of the measuring device is calculated and displayed in the display screen as the figure distance.

Accordingly, the figure distance can be immediately measured. Also, even though any figure element of the solid figure such as a surface, an edge or a vertex does not exist at the first or second point, the figure distance can be measured because the first and second constitutional elements of the measuring device can be moved to anywhere.

It is preferable that the step of storing pieces of structural data include the step of storing a piece of axial data denoting a locus of a connecting axis of which one end is connected to the first constitutional element and the other end is connected to the second constitutional element in the measuring device data storing section to display the connecting axis in the display screen in the step of displaying the measuring device, and the step of extending or shortening the length of the measuring device including the step of extending or shortening the connecting axis to extend or shorten the length of the measuring device.

In the above steps, the connecting axis of which the axial data are stored is extended or shortened to measure the figure distance.

In addition, it is preferable that the method additionally include the step of curving the connecting axis displayed in the display screen along a curved outline of the solid surface, a curved length of the connecting axis being calculated in the step of calculating the length of the measuring device, and the curved length being displayed in the display screen as the figure distance in the step of displaying the length of the measuring device.

In the above step, the connecting axis is curved along the curved outline of the solid surface. Therefore, even though the outline of the solid figure is complicated because the outline is curved, the figure distance can be easily measured.

BRIEF DESCRIPTION OF THE DRAWINGS

The objects, features and advantages of the present invention will be apparent from the following description taken in conjunction with the accompanying drawings, in which:

FIGS. 4A, 4B show translation movement of a measuring device moved by the operation of a mouse according to the present invention;

FIGS. 4C, 4D show a measuring device of which first and second panels are transformed by the operation of a mouse according to the present invention;

FIG. 5 shows a pair of measuring devices displayed in a figure display region and an attribute menu displayed in a measuring device attribute region;

FIGS. 6A to 6D show the function of a display mode selected by the operation of a mouse;

FIG. 9 is a flow chart briefly showing the operation of the solid distance measuring apparatus shown in FIG. 7;

FIG. 9 shows figure elements of a solid figure and coordinates of the figure elements stored in a solid figure element storing section shown in FIG. 7;

FIG. 10A shows pieces of structural data of a measuring device and pieces of attribute data of the measuring device stored in a measuring device data storing section shown in FIG. 7;

FIG. 10B shows the structural data and the attribute data stored in the measuring device data storing section shown in FIG. 7 in cases where a pair of measuring devices are displayed;

FIG. 13 is a flow chart showing details of a step 103 shown in FIG. 8;

FIG. 14 shows various types of selection data listed in a piece of attribute formation shown in FIG. 10A;

FIG. 15A shows a piece of mouse information and a motion message stored in a mouse position storing section shown in FIG. 7;

FIG. 15B shows pieces of initial data of the mouse information and the motion message shown in FIG. 15A;

FIG. 16 is a flow chart showing details of a step 104 shown in FIG. 8;

FIG. 17 is a flow chart showing details of a step 105 shown in FIG. 8;

FIGS. 22A to 22D show a measuring device rotated by performing a "rotation" operation shown in FIG. 20A according to a second embodiment of the present invention;

FIG. 25 shows a data flow following the performance of an editing mode "rotation" shown in FIG. 20A;

FIG. 26 shows a data flow following the performance of an editing mode "joining" or "elimination" shown in FIG. 20A;

DETAIL DESCRIPTION OF THE PREFERRED EMBODIMENTS

Figure 1:
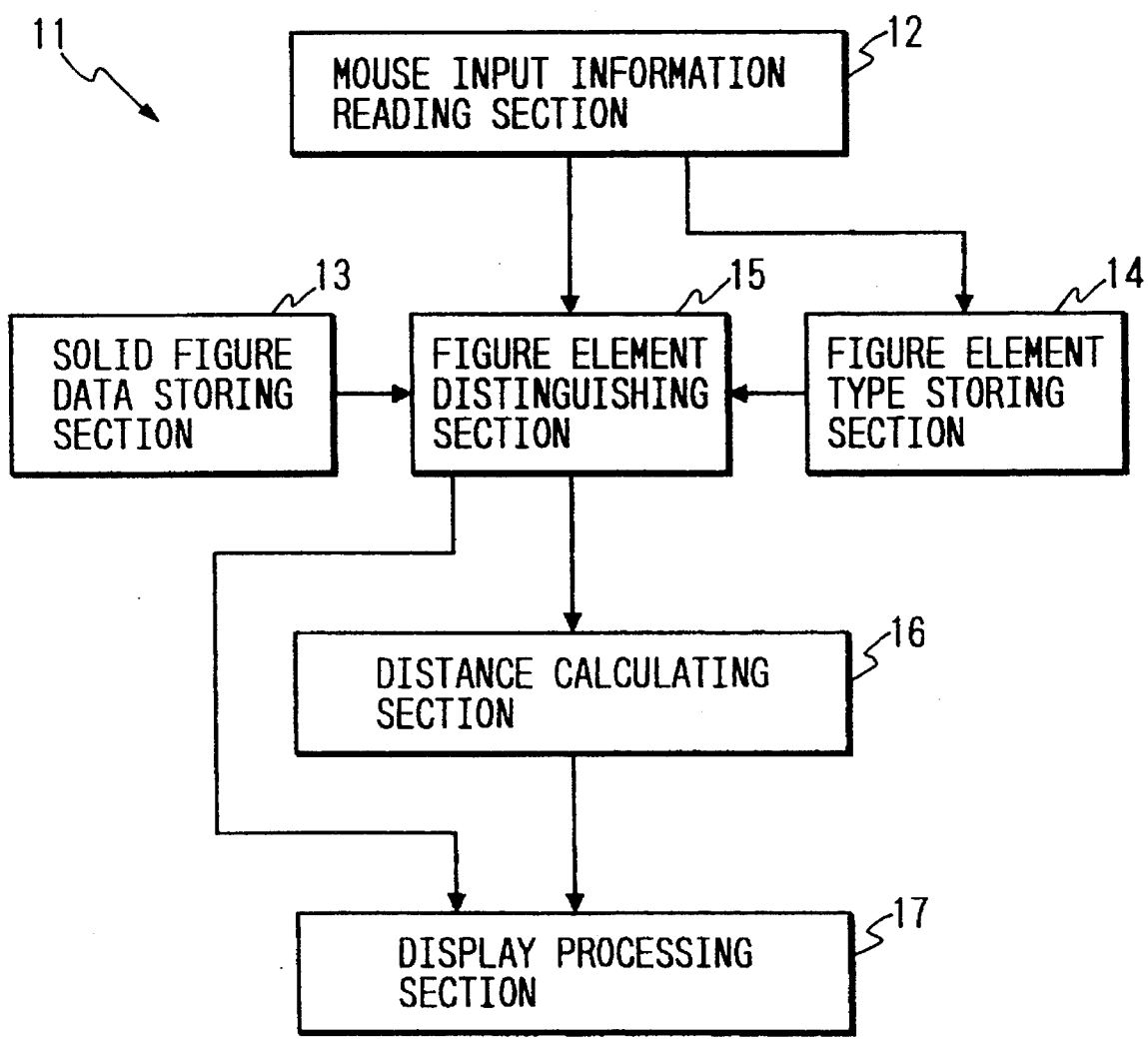
FIG. 1 is a block diagram of a conventional distance measuring apparatus for measuring a distance between solid figures.
Figure 2A:
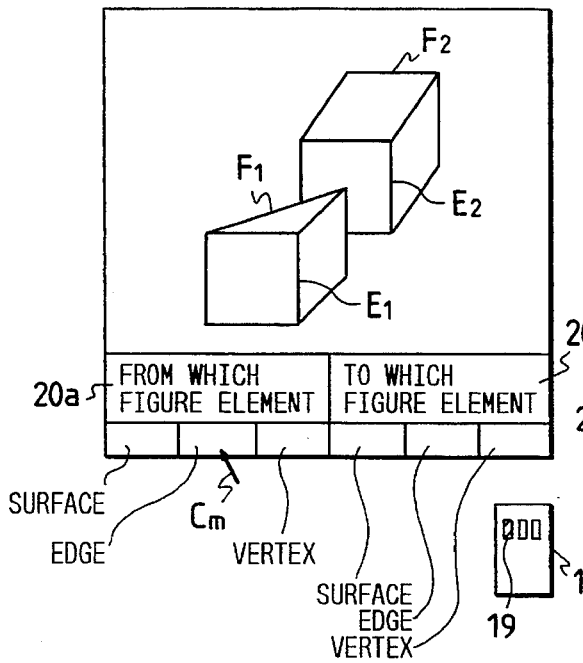
FIGS. 2A to 2D show a procedure for determining a distance between figure elements of figures facing each other with the conventional apparatus shown in FIG. 1.
Figure 2C:
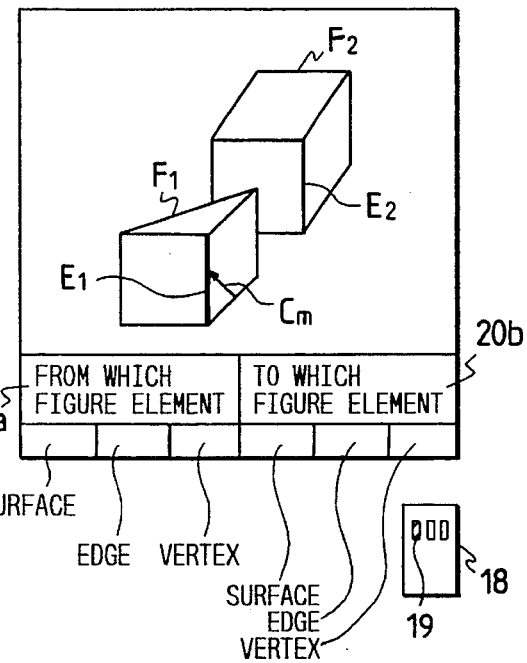
Figure 2B:
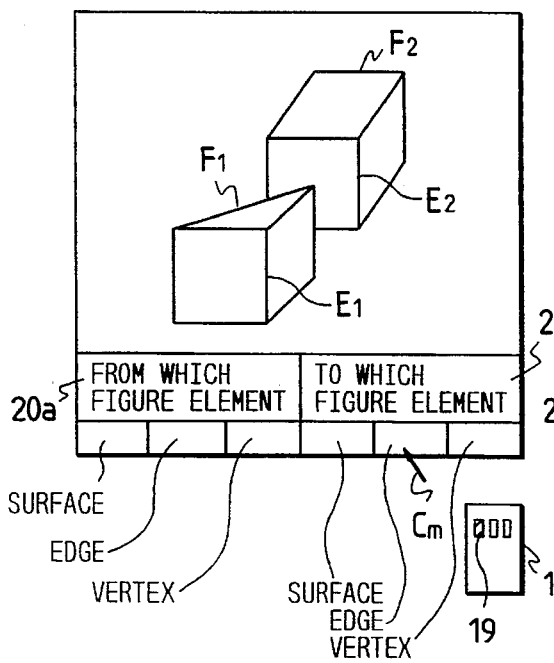
Figure 2D:
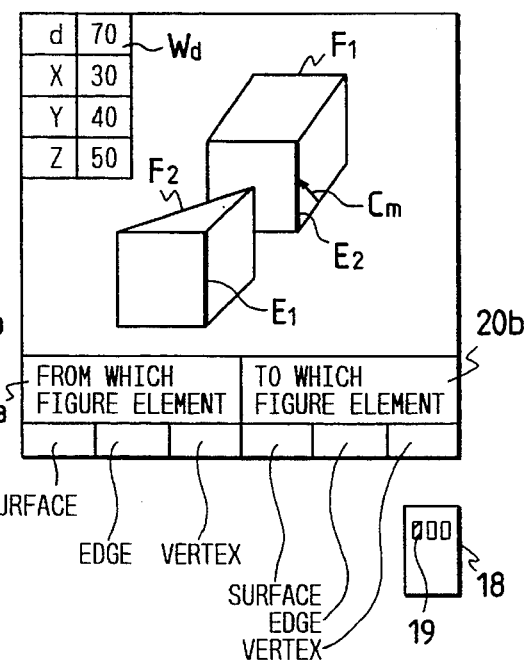

Preferred embodiments of a solid figure distance measuring apparatus according to the present invention are described with reference to drawings.

An operation for measuring a distance between solid figures displayed in a display screen is initially described in brief prior to the description of first to fourth embodiments of the present invention to realize an concept of the present invention.

FIGS. 3A to 3D show a measuring device of which an axis is lengthened or shortened by the operation of a mouse according to the present invention. FIGS. 4A, 4B show translation movement of a measuring device moved by the operation of a mouse according to the present invention. FIGS. 4C, 4D show a measuring device of which first and second panels are transformed by the operation of a mouse according to the present invention.

As shown in FIGS. 3A to 3D, a measuring device 21 is displayed in a figure display region 22a in which a solid figure Fi is displayed. The figure display region 22a is arranged in an upper portion of a display screen 22. The measuring device 21 is composed of various constitutional elements such as a connecting axis 23 having a scale 24, a first rectangular flat panel 25 of which a gravity center is connected to one end of the connecting axis 23, a second rectangular flat panel 26 of which a gravity center is connected to the other end of the connecting axis 23, and a distance display window 27 for numerically displaying a distance between the first and second panels 25, 26.

The first and second panels 25, 26 are moved by operating a mouse 28. For example, in cases where the first panel 25 is overlapped with a first figure element E1 and the second panel 26 is overlapped with a second figure element E2, a distance between the first and second figure elements E1, E2 is displayed in the distance display window 27.

Figure 3A:
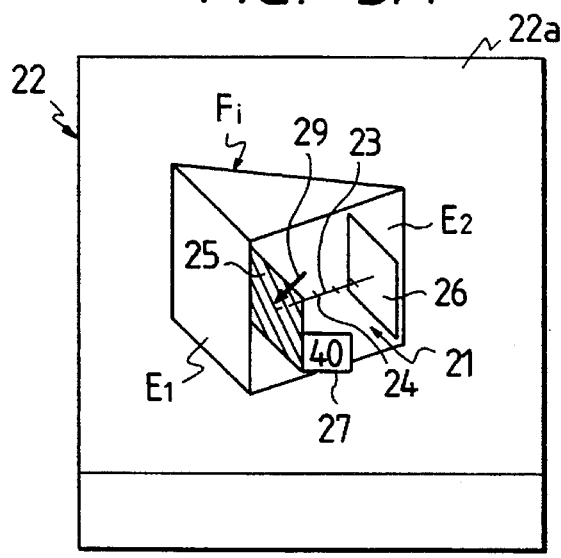
FIGS. 3A to 3D show a measuring device of which an axis is lengthened or shortened by the operation of a mouse according to the present invention.
Figure 3B:
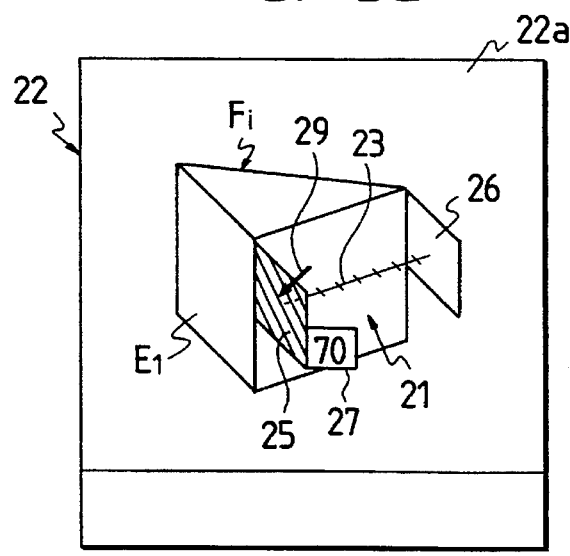
Figure 3C:
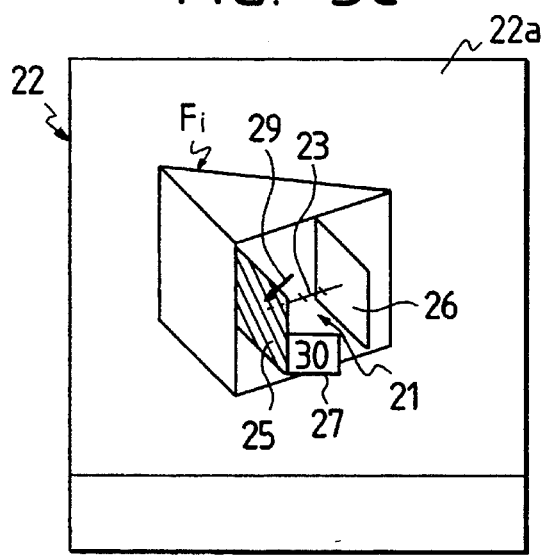

The movement of the panels 25, 26 is performed as follows. As shown in FIG. 3A, when a left mouse button 30 of the mouse 28 is pushed down by an operator after the first panel 25 is designated by a mouse cursor 29 of the mouse 28, the first panel 25 designated is emphatically displayed, and the distance display window 27 is attached to the first panel 25. Thereafter, as shown in FIG. 3B, when a central mouse button 31 of the mouse 28 is pushed down, the second panel 26 arranged with the first panel 25 in a pair is moved in an extending direction to lengthen a distance between the panels 25, 26, and the distance lengthened is displayed in the distance display window 27. Also, as shown in FIG. 3C, when a right mouse button 32 of the mouse 28 is pushed down, the second panel 26 arranged with the first panel 25 in a pair is moved in a shortening direction to shorten the distance between the panels 25, 26, and the distance shortened is displayed in the distance display window 27.

Figure 3D:
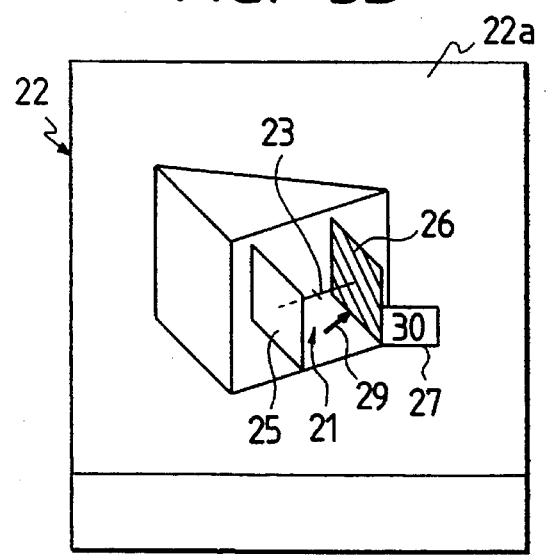

In contrast, as shown in FIG. 3D, when the left mouse button 30 is pushed down after the second panel 26 is designated by the mouse cursor 29, the second panel 26 designated is emphatically displayed, and the distance display window 27 is attached to the second panel 26. Thereafter, when the central mouse button 31 is pushed down, the first panel 25 is moved in a direction to lengthen the distance between the panels 25, 26. Also, when the right mouse button 32 is pushed down, the first panel 25 is moved in the other direction to shorten the distance between the panels 25, 26.

Also, as shown in FIG. 4A, the left mouse button 30 is pushed down after a gravity center of the first panel 25 (or the second panel 26) is almost designated by the mouse cursor 29. Thereafter, as shown in FIG. 4B, when the mouse 28 is moved in a first direction, the measuring device 21 is moved in the first direction with the mouse 28 according to a translation operation. Also, as shown in FIG. 4C, the left button 30 is pushed down after an edge of the first panel 25 (or the second panel 26) is almost designated by the mouse cursor 29. Thereafter, as shown in FIG. 4D, when the mouse 28 is moved in a lower direction, the edge designated by the mouse cursor 29 is moved in the lower direction with the mouse 28. Therefore, a square shape of the first panel 25 designated by the mouse cursor 29 is transformed to a stick shape like a straight line. In the same manner, a square shape of the second panel 26 not designated is almost transformed to a straight line.

FIG. 5 shows a pair of measuring devices displayed in the figure display region 22a and an attribute menu displayed in a measuring device attribute region.

As shown in FIG. 5, a measuring device attribute region 22b is arranged in a lower portion of the display screen 22. In the attribute region 22b, an attribute menu is displayed to select various attributes of the measuring device 21 (or first and second measuring devices 21a, 21b). In detail, the attribute menu comprises a display mode area 41 for selecting a display mode to display the measuring device 21 in the figure display region 22a, a binding mode area 42 for selecting a binding mode in which the first panel 25 (or the second panel 26) is automatically overlapped with a figure element of a solid figure positioned near the first panel 25 to bind the first panel 25 to the figure element, an editing mode area 43 for selecting a type of editing mode to rotate the measuring device 21 or joining the second measuring device 21b to the first measuring device 21a, a scale distance selecting area 44 for selecting a distance between scale marks of the scale 24, an axis attribute setting area 45 for setting an axial type of the connecting axis 23 (or an connecting axis 23a of the first measuring device 21a and an connecting axis 23b of the second measuring device 21b) to a straight line or a curved line, a curvature selecting area 46 for selecting a curvature of the connecting axis 23 (or the connecting axes 23a, 23b) in cases where the connecting axis 23 is set to the curved line in the setting area 45, and a coupled panel display area 47 for displaying the numbers P1, P2 (or P2, P3) of the panels 25, 26 coupled to each other through the connecting axis 23 (or the connecting axes 23a, 23b).

In cases where the first measuring device 21a having the panels 25, 26 (the numbers P1, P2) is jointed to the second measuring device 21b having the panels 26, 26b (the numbers P2, P3) by selecting a type of editing mode in the editing mode area 43, the areas 44, 45, 46 and 47 are provided for each of the measuring devices 21a, 21b. The editing mode is described in detail in a second embodiment. Also, in cases where the connecting axis 23 is set to a curved line by designating the setting area 45 with the mouse cursor 29, the connecting axis 23 is curved. The setting of the axial type is described in detail in a fourth embodiment.

FIGS. 6A to 6D show the function of a display mode selected by the operation of a mouse;

As shown in FIG. 6A, when the left mouse button 30 of the mouse 28 is pushed down after positioning the mouse cursor 29 at the display mode area 41 on condition that the measuring device 21 is displayed in the region 22a, the display mode is changed from an "on" condition to an "off" condition. Therefore, as shown in FIG. 6B, the measuring device 21 displayed disappears. Also, as shown in FIG. 6C, when the left mouse button 30 of the mouse 28 is pushed down after positioning the mouse cursor 29 at the display mode area 41 on condition that the display mode is set to the "off" condition, the display mode is changed to the "on" condition. Therefore, as shown in FIG. 6D, the measuring device 21 is displayed in the region 22a.

First Embodiment

Figure 7:
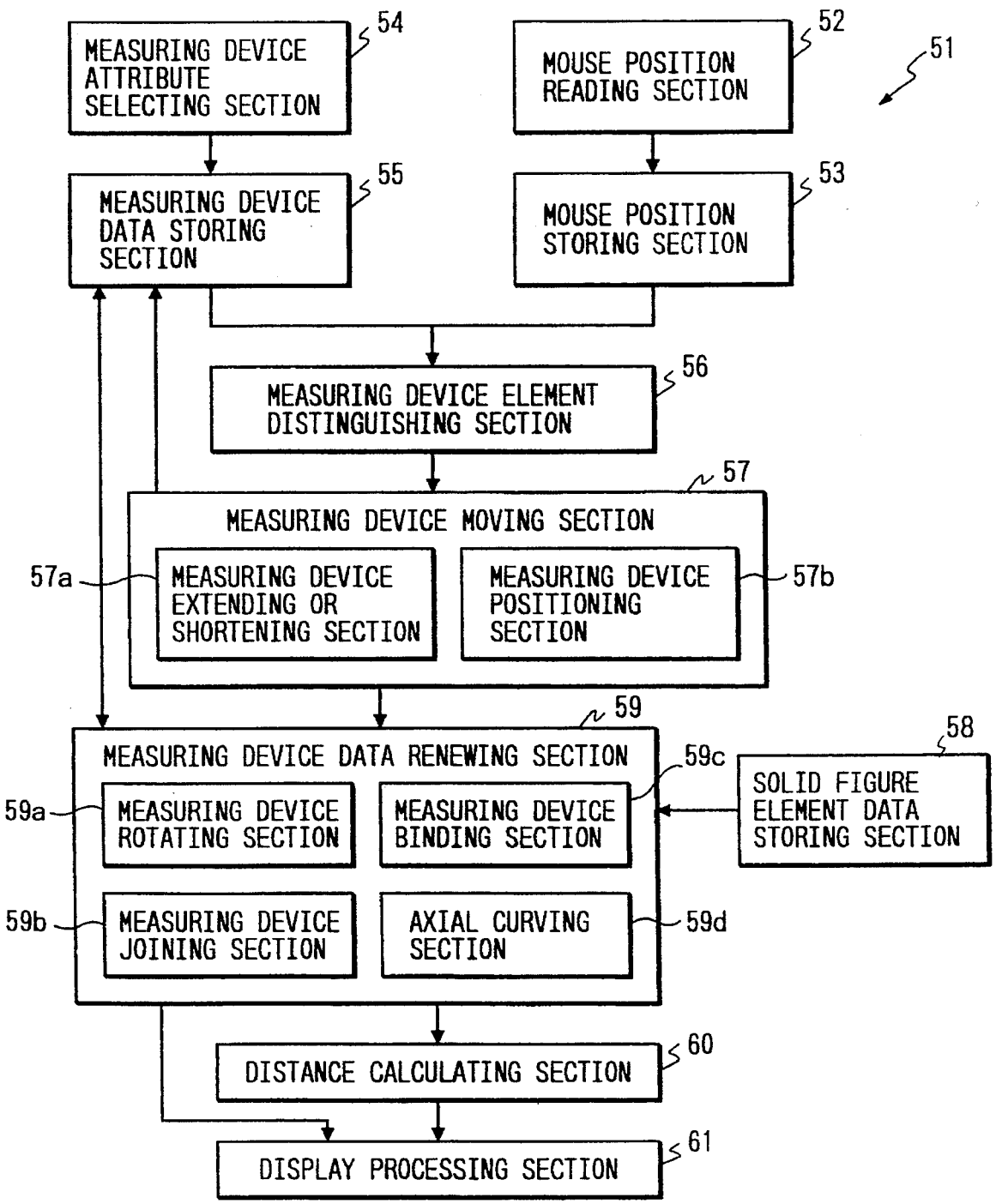
FIG. 7 is a block diagram of a solid figure distance measuring apparatus according to first to fourth embodiments of the present invention.

The operations shown in FIGS. 3 to 6 are performed in an apparatus shown in FIG. 7.

FIG. 7 is a block diagram of a solid figure distance measuring apparatus according to first to fourth embodiments of the present invention.

As shown in FIG. 7, a solid figure distance measuring apparatus 51 comprises a mouse position reading section 52 for reading a position of the mouse cursor 29 which designates a particular constitutional element of the measuring device 21 displayed in the figure display region 22a, a mouse position storing section 53 for storing the position of the mouse cursor 29 read in the reading section 52, a measuring device attribute selecting section 54 for selecting an attribute of the measuring device 21 by positioning the mouse cursor 29 in the measuring device attribute region 22b, a measuring device data storing section 55 for storing pieces of attribute data denoting the attributes of the measuring device 21 selected in the selecting section 54 and pieces of structural data of the measuring device 21, and a measuring device element distinguishing section 56 for distinguishing the particular constitutional element of the measuring device 21 existing at the position of the mouse cursor 29 stored in the storing position 53 from constitutional elements of the measuring device 21 with reference to the attribute and structural data of the measuring device 21 stored in the storing section 55. Therefore, the selected attributes of the measuring device are stored in the storing section 55, and the particular constitutional element of the measuring device 21 is distinguished in the distinguishing section 56.

The apparatus 51 further comprises a measuring device moving section 57 for renewing the structural data of the measuring device 21 to move or transform the measuring device 21 displayed in the display screen 22 on the basis of the particular constitutional element of the measuring device 21 distinguished in the distinguishing section 56 according to a motion mode such as "extension" of the connecting axis 23, "shortening" of the connecting axis 23, "translation movement" of the measuring device 21 or "transformation" of the panels 25 and 26, a solid figure element data storing section 58 for storing pieces of figure element data denoting shapes of figure elements of one or more solid figures which are displayed in the figure displaying region 22a, a measuring device data renewing section 59 for renewing the structural data of the measuring device 21 to edit or/and move the measuring device 21 according to the selection of the attributes stored in the storing section 55 while referring the figure elements of the solid figures stored in the storing section 58, a distance calculating section 60 for calculating a distance between the panels 25, 26 of the measuring device 21 of which the structural data are renewed in the renewing section 59, and a display processing section 61 for displaying the measuring device 21 of which the structural data are renewed in the renewing section 59 and the distance calculated in the calculating section 60.

In the above configuration, the operation of the measuring apparatus 51 in which a distance of a route between first and second points of a solid figure is measured is described in brief with reference to FIG. 8.

In a step 101, pieces of structural data of the measuring device 21 are initialized and stored in the storing section 55.

In a step 102, the measuring device 21 of which the structural data initialized are stored in the storing section 55 are displayed in the figure display region 22a by the function of the display processing section 61. Also, one or more solid figures of which the figure elements are stored in the storing section 58 are displayed in the same manner. In addition, an attribute menu stored in the storing section 55 is displayed in the measuring device attribute region 22b.

In a step 103, one or more areas arranged in the measuring device attribute region 22b are designated by the mouse cursor 29 one after another to select one or more attributes of the measuring device 21 in the selecting section 54.

In a step 104, a position of the mouse cursor 29 designating one of the constitutional elements of the measuring device 21 in the figure display section 22a is read in the reading section 52. Also, which button of the mouse 28 is pushed down is detected in the reading section 52.

In a step 105, it is distinguished in the distinguishing section 56 which constitutional element of the measuring device 21 is designated by the mouse cursor 29. In this case, the position of the mouse cursor 29 stored in the storing section 53 and the attribute and structural data of the measuring device 21 stored in the storing section 55 are referred.

In a step 106, the structural data of the measuring device 21 is renewed in the moving section 57 to move or transform the measuring device on the basis of the constitutional element of the measuring device 21 distinguished in the distinguishing section 56 according to the motion mode. For example, the connecting axis 23 of the measuring device 21 is extended or shortened, or the panels 25, 26 of the measuring device 21 are transformed.

In a step 107, the structural data of the measuring device 21 is renewed in the renewing section 59 to rotate the measuring device 21 or join a second measuring device to the measuring device 21 in cases where the selection of the editing mode is stored in the storing section 55. Also, in cases where the selection of the binding mode is stored in the storing section 55, the first panel 25 (or the second panel 26) of the measuring device 21 is overlapped with an figure element of a solid figure displayed in the region 22a to bind the first panel 25 with the figure element while referring the figure elements of the solid figures stored in the storing section 58.

In a step 108, the distance between the first and second panels 25, 26 is calculated in the calculating section 60.

In a step 109, the measuring device 21 of which the structural data are renewed in the step 107 is displayed in the region 22a, and the distance calculated in the step 108 is displayed in the distance display window 27 by the function of the display processing section 61.

Thereafter, the procedure of the steps 103 to 109 is repeated until the first panel 25 is positioned at the first point of the solid figure and the second panel 26 is positioned at the second point of the solid figure.

The operation of the measuring apparatus 51 in each of the steps is described in detail.

FIG. 9 shows pieces of figure element data of a solid figure stored in the solid figure element storing section 58.

As shown in FIG. 9, the figure elements of each of the solid figures displayed in the figure displaying region 22a are stored with the numbers of the figure elements and positional coordinates of the figure elements in the solid figure element storing section 58 in tabular form.

FIG. 10A shows pieces of structural data of one or more measuring devices and pieces of attribute data of the measuring devices stored in the measuring device data storing section 55.

As shown in FIG. 10A, the structural data of the measuring device 21 stored in the measuring device data storing section 55 are classified into a piece of axis information stored in an axis field, a piece of panel information stored in a panel field, a piece of scale information stored in a scale field, a piece of measured distance information stored in a distance field, a piece of distance display window information stored in a window field.

The axis information is composed of the number A×1 of the connecting axis 23, the numbers P1, P2 of the first and second panels 25, 26 connected to the connecting axis 23, a piece of first coordinate data denoting first coordinates $(x_{g1}, y_{g1}, z_{g1})$ of one end of the connecting axis 23 connected to one of the panels, a piece of second coordinate data denoting second coordinates $(x_{g2}, y_{g2}, z_{g2})$ of the other end of the connecting axis 23 connected to the other panel, and pieces of positional data denoting a locus of the connecting axis 23. In cases where a plurality of measuring devices (for example, a measuring device 21a and a measuring device 21b) are utilized, the axis information is prepared for each of the measuring devices, as shown in FIG. 10B.

Figures 11A, 11B, 11C, 12:
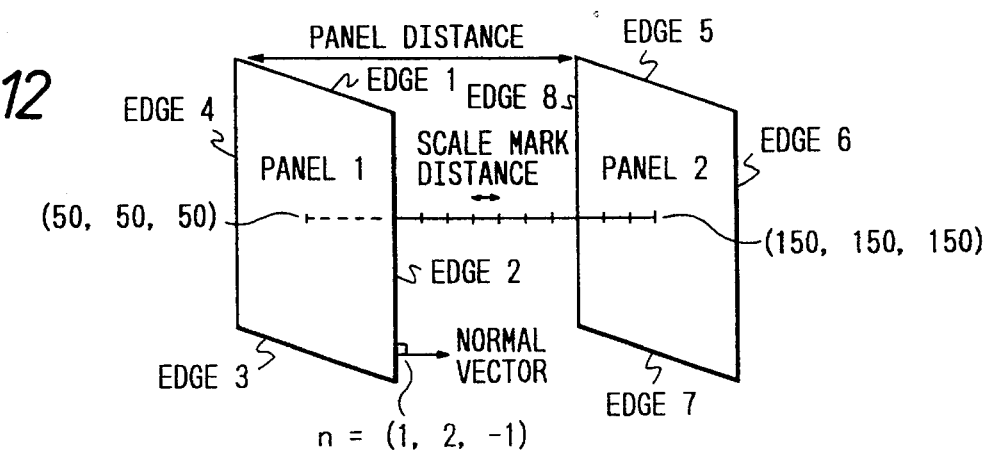
FIG. 11A shows pieces of initial shape data of first and second panels listed in a piece of panel information shown in FIG. 10.
FIG. 11B shows initial values of a piece of measured distance information shown in FIG. 10A.
FIG. 11C shows pieces of initial attribute data in a piece of attribute information shown in FIG. 10A.
FIG. 12 shows a measuring device displayed on the basis of the initial data and values shown in FIGS. 11A, 11B and 11C.

The panel information is composed of pieces of shape data which are provided for each of the first and second panels 25, 26 of the measuring device 21. The shape data of each of the panels is stored in a shape block and is composed of the number P1 or P2 of the panel, a length of the panel, a width of the panel, gravity center coordinates $(x_{g1}, y_{g1}, z_{g1})$ or $(x_{g2}, y_{g2}, z_{g2})$ of the panel, components (u,v,w) of a normal vector of the panel, and pieces of positional coordinate data respectively denoting positional coordinates of a figure element such as a panel or edges of a panel. In cases where a plurality of measuring devices (for example, a measuring device 21a and a measuring device 21b) are utilized, the panel information is prepared for more than two panels, as shown in FIG. 10B. The shape data of the panel information are initialized in the step 101 as shown in FIG. 11A.

The scale information is composed of the number A×1 of the connecting axis 23 and pieces of coordinate data denoting coordinates of scale marks marked to the connecting axis 23. In cases where a plurality of measuring devices are utilized, the scale information is prepared for each of the measuring devices, as shown in FIG. 10B.

The measured distance information is composed of a panel distance between the first and second panels 25, 26 arranged at both ends of the measuring device 21 and a changing degree of the distance. The distance is lengthened or shortened by the changing degree each time the mouse button 31 or 32 is pushed down in the step 104. The distance and the changing degree in the measured distance information are initialized in the step 101 as shown in FIG. 11B.

The distance display window information is composed of a length of the window 27, a width of the window 27, positional coordinates of the window 27, and the number P1 or P2 of the first or second panel 25 or 26 attached to the window 27.

The attribute data of the measuring device 21 are listed as a piece of attribute information in an attribute field. The attribute information is compose of a piece of information of the display mode, a piece of information of the binding mode, a piece of information of the editing mode, and a piece of information of the connecting axis 23. The information of the connecting axis 23 is composed of a piece of axial type data denoting an axial type of the connecting axis 23 such as a straight line or a curved line, a piece of curvature data denoting a curvature of the connecting axis 23, a piece of scale data denoting a distance between the scale marks of the scale 24, and the numbers P1, P2 of the first and second panels 25, 26 connected to the connecting axis 23. In cases where a plurality of measuring devices are utilized, the information of the connecting axis 23 is prepared for each of the measuring devices, as shown in FIG. 10B. The attribute information is initialized in the step 101 as shown in FIG. 11C.

Therefore, after the structural and attribute data of the measuring device 21 are initialized in the step 101, the measuring device 21 initialized is displayed in the step 102 as shown in FIG. 12.

Thereafter, the step 103 is executed as shown in FIG. 13.

That is, pieces of selection data consisting of the display mode, the binding mode, the editing mode, the axial attribute and the distance between the scale marks are selected by designating the areas arranged in the attribute region 22b with the mouse cursor 29 (step 103A). Various types of selection data of the attribute information are shown in FIG. 14. Thereafter, the selection data are stored in the storing section 55 as the attribute data of the measuring device 21 shown in FIG. 10A (step 103B).

In the storing section 53, as shown in FIG. 15A, a piece of mouse information and a motion message are stored. The mouse information is composed of a piece of current coordinate data denoting current coordinates of the mouse cursor 29 moved with the mouse 28, a piece of current condition data denoting a current condition of the mouse 28 such as an "on" condition or an "off" condition, a piece of mouse button data denoting a mouse button 30, 31 or 32 currently operated by the operator, a piece of preceding coordinate data denoting preceding coordinates of the mouse cursor 29, and a piece of preceding condition data denoting a preceding condition of the mouse 29. The motion message is composed of a piece of motion mode data denoting a motion mode specified according to a mouse button operated by the operator and a piece of element data denoting a constitutional element (a panel or an edge) of the measuring device 21 processed according to the motion mode. Types of the motion modes are classified into "extension" of the connecting axis 23, "shortening" of the connecting axis 23, "element designation" denoting the designation of the first or second panel 25 or 26 indicated by the mouse cursor 29, "translation movement" of the measuring device 21, "transformation" of the first and second panels 25, 26 and "no motion". The motion mode data is stored in a motion mode field, and the element data is stored in an element field. As shown in FIG. 15B, the mouse information and the motion message are set to pieces of initial data in an initial condition.

Therefore, when the operator operates the mouse 28 in the step 104, the mouse 28 is set to the "on" condition, and the position of the mouse cursor 29 is read out in the reading section 52. Thereafter, the position of the mouse cursor 29 is stored in the storing section 53 as the current coordinates of the mouse cursor 29, and the motion message is rewritten on the basis of the position of the mouse cursor 29. The procedure in the step 104 executed to change the mouse information and the motion message stored in the storing section 53 is shown in FIG. 16 in detail. In this case, the first panel 25 of the measuring device 21 is, for example, designated by the mouse cursor 29.

As shown in FIG. 16, in a step 104A, the current coordinate data stored in a current coordinate field of the storing section 53 is transferred to a preceding coordinate field to replace the preceding coordinate data with the current coordinate data. Also, the current condition data stored in a current condition field of the storing section 53 is transferred to a preceding condition field to replace the preceding condition data with the current condition data.

In a step 104B, the position of the mouse cursor 29 currently read is stored in the current coordinate field, and the condition data denoting the "on" condition is stored in the current condition field. Also, when the operator pushes down a mouse button, a piece of mouse button data denoting the mouse button operated is stored in the storing section 53.

In a step 104C, it is judged which mouse button 30, 31 or 32 is operated by the operator. The judgement is performed by checking the mouse button data stored in the storing section 53. In cases where the mouse button data denoting the left mouse button 30 is stored in the storing section 53 by the operation of the left mouse button 30, the procedure proceeds to a step 104D.

In the step 104D, the current condition data stored in the current condition field is checked, and it is judged whether the mouse 28 is currently in the "on" condition or the "off" condition. In cases where the mouse 28 is in the "on" condition, the procedure proceeds to a step 104E.

In the step 104E, the preceding condition data stored in the preceding condition field is checked, and it is judged whether the mouse 28 has been previously in the "on" condition or the "off" condition. In cases where the mouse 28 is in the "off" condition, the procedure proceeds to a step 104F. Also, in cases where the mouse 28 is in the "on" condition, the procedure proceeds to a step 104G.

In the step 104F, the motion mode stored in the motion mode field of the storing section 53 is set to the "element designation". Therefore, in cases where the first panel 25 is designated by the mouse cursor 29; the first panel 25 is stored in the element field as the element data to emphatically display the first panel 25.

In the step 104G, the motion mode stored in the motion mode field is set to the "translation movement" of the measuring device 21 to move the measuring device 21 according to the translation movement.

In cases where it is judged in the step 104D that the mouse 28 is in the "off" condition, the procedure proceeds to a step 104H. In the step 104H, the motion mode stored in the motion mode field is set to the "no motion". Therefore, any motion is not performed for the measuring device 21.

In cases where the central mouse button 31 is operated by the operator to store the mouse button data denoting the central mouse button 31, it is judged in the step 104C that the central mouse button 31 is operated, and the procedure proceeds to a step 104I. In the step 104I, the motion mode stored in the motion mode field is set to the "extension" of the connecting axis 23.

In cases where the right mouse button 32 is operated by the operator to store the mouse button data denoting the right mouse button 32, it is judged in the step 104C that the right mouse button 32 is operated, and the procedure proceeds to a step 104J. In the step 104J, the motion mode stored in the motion mode field is set to the "shortening" of the connecting axis 23.

Therefore, in cases where the operator pushes down the left mouse button 30 at a first time and the operator pushes down one of the mouse button 30, 31 or 32 at a second time, the motion mode is set to the "element designation" at the first time, and the motion mode is set to the "translation movement", the "extension" or the "shortening" at the second time.

The mouse information and the motion message which are changed according to the position of the mouse cursor 29 read in the reading section 52 and are stored in the storing section 53 are transferred to the distinguishing section 56 to distinguish an constitutional element of the measuring device 21 designated by the mouse cursor 29. In this case, the first panel 25 is, for example, designated by the mouse cursor 29. The operation for distinguishing a constitutional element of the measuring device 21 in the distinguishing section 56 according to the step 105 is shown in FIG. 17 in detail.

As shown in FIG. 17, in a step 105A, the mouse information and the motion message stored in the storing section 53 are transferred to the distinguishing section 56.

In a step 105B, it is judged which type of motion mode stored in the motion mode field of the motion message is set in the step 104. In cases where the motion mode is set to the "translation movement", the procedure proceed to a step 105C.

In a step 105C, the shape data of the panel information stored in the storing section 55 is transferred to the distinguishing section 56, and a first distance between the current coordinates of the mouse cursor 29 and the gravity center of the first panel 25 is calculated, and a second distance between the current coordinates of the mouse cursor 29 and an edge of the first panel 25 positioned nearest to the mouse cursor 29 is calculated.

In a step 105D, it is judged whether or not the second distance is shorter than or equal to the first distance. In cases where the second distance is shorter than or equal to the first distance, the procedure proceeds to a step 105E.

In the step 105E, the motion mode stored in the motion mode field is changed to the "transformation".

In a step 105F, the element data stored in the element field of the motion message is changed to another element data denoting the edge of the first panel 25, and the procedure proceeds to a step 105G.

In the step 105G, the mouse information and the motion message changed in the steps 105E and 105F are transferred to the moving section 57. Also, the attribute data of the measuring device 21 stored in the storing section 55 are transferred to the moving section 57.

In contrast, it is judged in the step 105D the second distance is longer than the first distance, the procedure proceeds to the step 105G. Also, it is judged in the step 105B that the motion mode is set to the "extension", the "shortening" or the "element designation", the procedure proceed to the step 105G. In the step 105G, the mouse information and the motion message stored in the storing section 53 are transferred to the moving section 57, and the attribute data of the measuring device 21 stored in the storing section 55 are transferred to the moving section 57.

Therefore, after the first or second panel 25 or 26 is emphatically displayed by selecting the motion mode "element designation", the motion mode "element designation" is changed to the "translation movement" or the "transformation" when the left mouse button 30 is again pushed down. The selection of the "translation movement" or the "transformation" is performed by checking the position of the mouse cursor 29 designating the first or second panel 25 or 26. Also, the element data is changed to the edge in cases where the motion mode "transformation" is selected, and the element data is maintained to a panel designated by the mouse cursor 29 in cases where the motion mode "element designation" is changed to the "extension", the "shortening", or "translation movement".

In the moving section 57, the panel information written in the storing section 55 shown in FIG. 10A is renewed in the step 106 to transform the measuring device 21 according to the type of the motion mode set in the steps 104, 105.

Figure 18A:
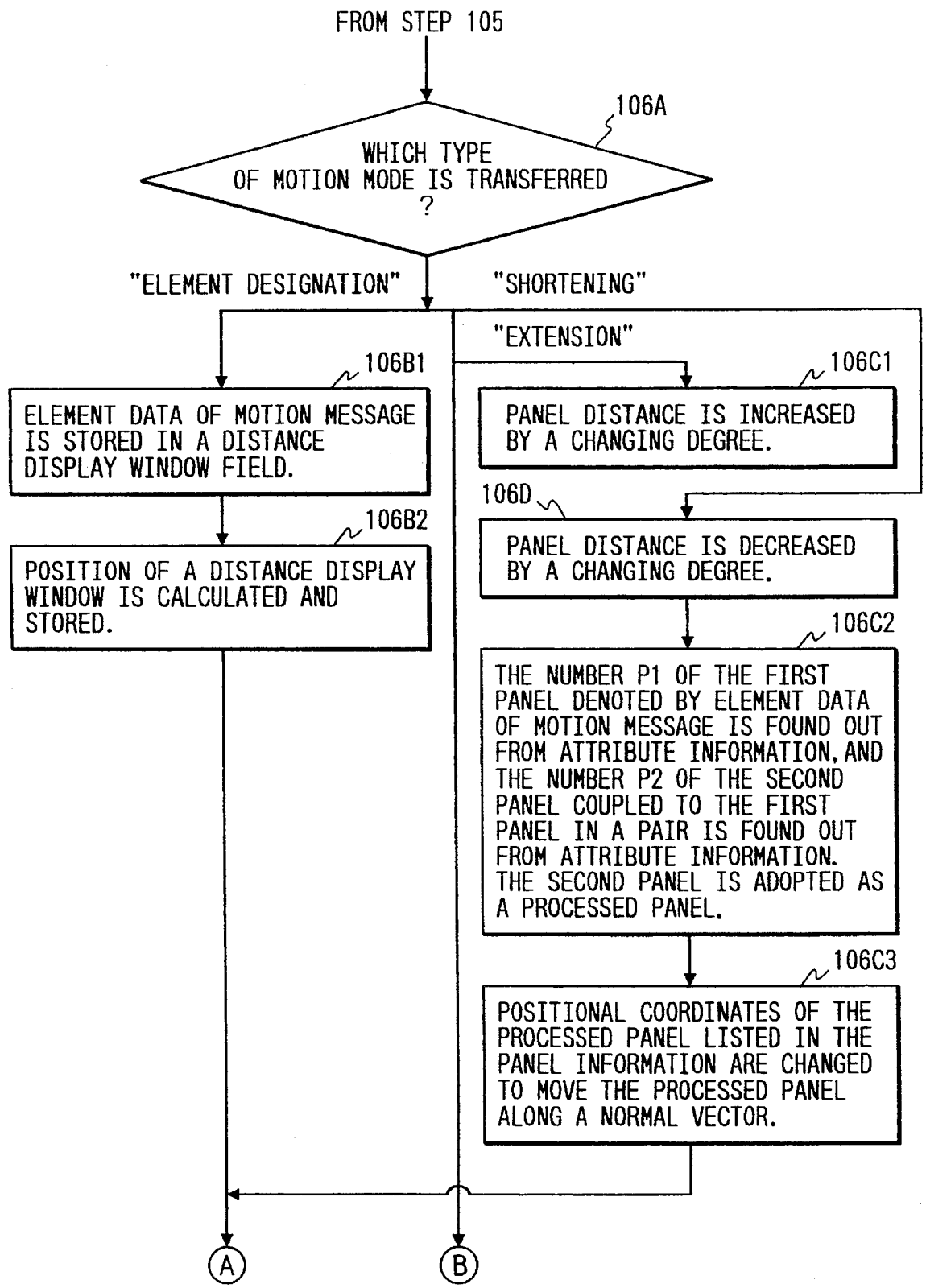
FIGS. 18A, 18B are a flow chart showing details of a step 106 shown in FIG. 8.
Figure 18B:
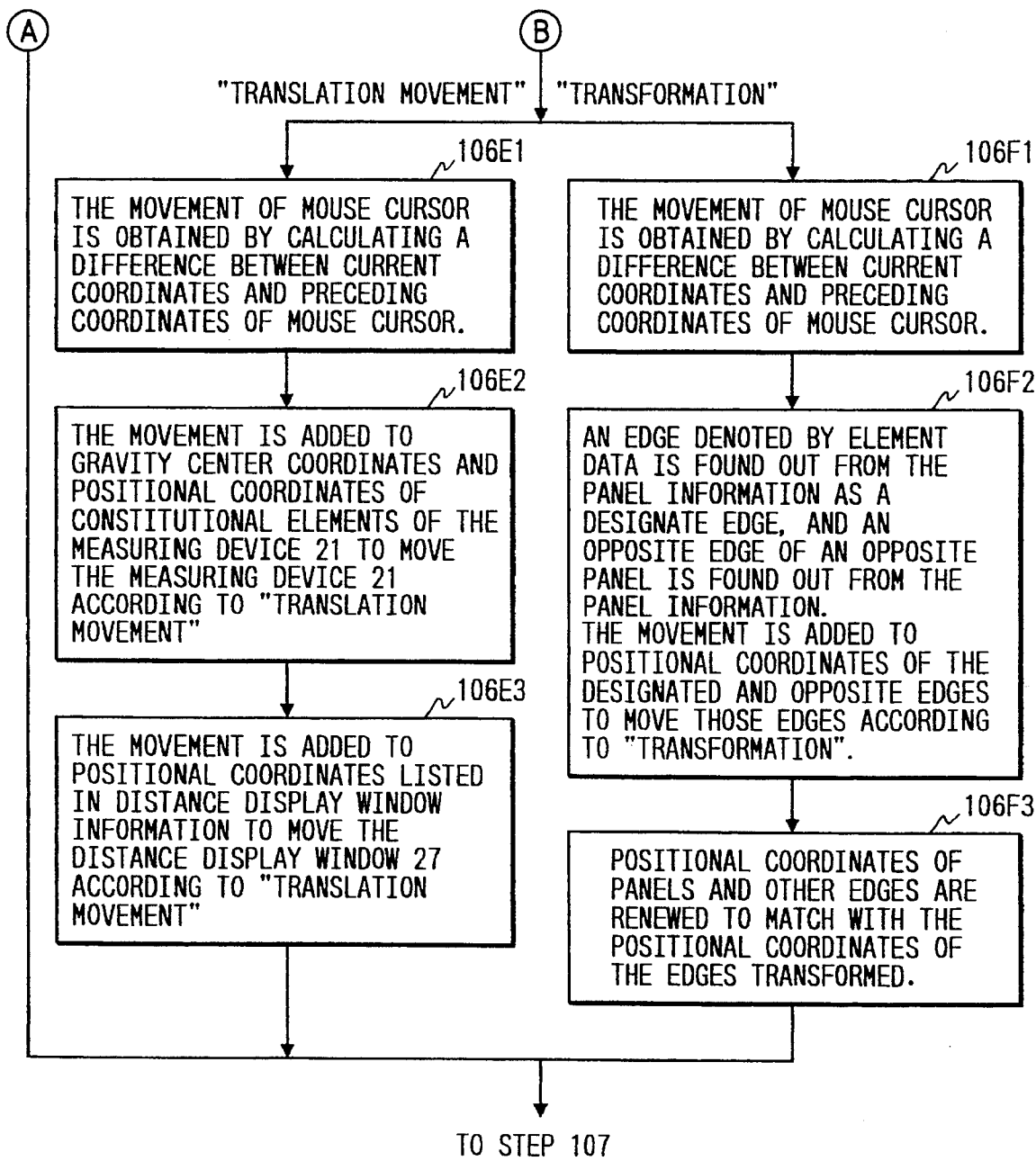

The procedure of the step 106 performed in the moving section 57 is shown in FIGS. 18A, 18B in detail.

As shown in FIG. 18A, it is judged in a step 106A which type of motion mode is transferred from the distinguishing section 56. In cases where the type of the motion mode is the "element designation", the procedure proceeds to a step 106B1.

In the step 106B1, the element data of the motion message transferred from the distinguishing section 56 is stored in the distance display window information field of the storing section 55 shown in FIG. 10A. Therefore, the element data denoting the first or second panel 25, 26 is stored as the distance display window information.

In a step 106B2, the position of the distance display window 27 is calculated and stored in the window field.

In cases where it is judged in the step 106A that the type of the motion mode is the "extension", the procedure proceeds to a step 106C1. In the step 106C1, the panel distance of the measured distance information stored in the storing section 55 is increased by the changing degree set in advance, and the procedure proceeds to a step 106C2.

In cases where it is judged in the step 106A that the type of the motion mode is the "shortening", the procedure proceeds to a step 106D. In the step 106D, the panel distance of the measured distance information stored in the storing section 55 is decreased by the changing degree set in advance, and the procedure proceeds to the step 106C2.

In the step 106C2, the number P1 (or P2) of the first panel 25 (or the second panel 26) denoted by the element data stored in the element data field of the motion message is found out from the attribute information stored in the storing section 55 shown in FIG. 10A. Thereafter, the number P2 (or P1) of the second panel 26 (or the second panel 26) coupled to the first panel 25 (or the second panel 26) in a pair is found out from the attribute information, and the second panel 26 (or the first panel 25) is adopted as a processed panel. The procedure of the step 106C2 is performed in a measuring device extending or shortening section 57a arranged in the moving section 57.

In a step 106C3, the positional coordinates of the processed panel listed in the panel information stored in the storing section 55 are changed to move the processed panel along the normal vector of the processed panel by the changing degree listed in the measured distance information. The procedure of the step 106C3 is performed in the section 57a.

Figure 19:
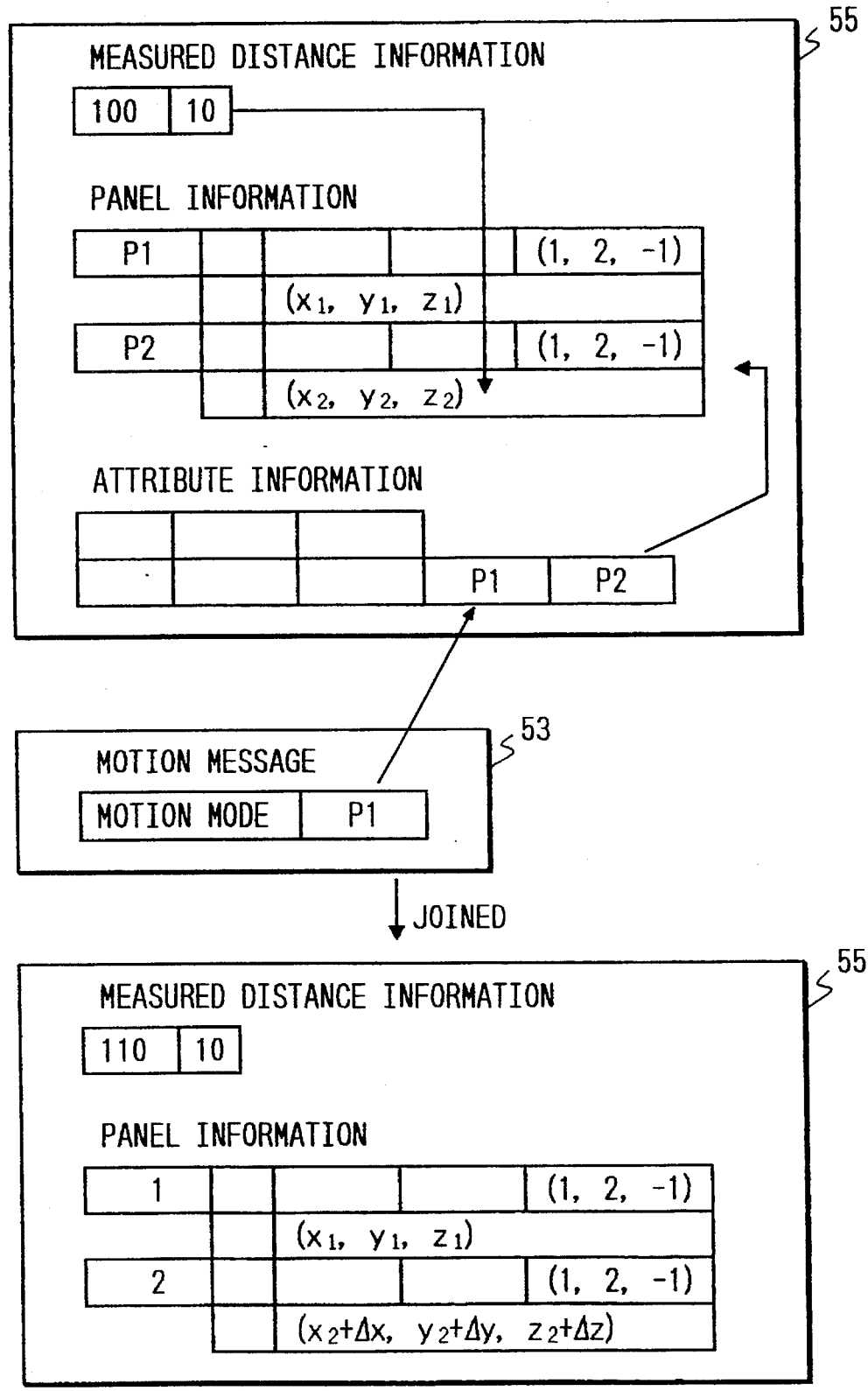
FIG. 19 shows a data flow following the performance of a motion mode "extension" or "shortening" shown in FIG. 18A.

For example, as shown in FIG. 19, in cases where the first panel 25 is designated by the mouse cursor 29, the number P1 of the first panel 25 is stored as the element data in the element data field of the motion message. Thereafter, the number P2 of the second panel 26 coupled to the first panel 25 designated is found out from the attribute information as the processed panel. Thereafter, the positional coordinates $(x_{2i}, y_{2i}, z_{2i})$ (i=1 to 4) of the second panel P2 listed in the panel information are changed to new positional coordinates $(x_{2i}+\Delta x, y_{2i}+\Delta y, z_{2i}+\Delta z)$ along the normal vector (1, 2, −1).

In cases where it is judged in the step 106A that the type of the motion mode is the "translation movement", the procedure proceeds to a step 106E1 shown in FIG. 18B. In the step 106E1, because the mouse 28 is moved by the operator after the left mouse button 30 is pushed down to set the motion mode to the "translation movement", the movement of the mouse cursor 29 moved with the mouse 28 is obtained by calculating a difference between the current coordinates of the mouse cursor 29 and the preceding coordinates of the mouse cursor 29 which are listed in the mouse information stored in the storing section 53 shown in FIG. 15. The movement of the mouse cursor 29 obtained is equal to the translation movement of the measuring device 21. The procedure of the step 106E1 is performed in a measuring device positioning section 57b arranged in the moving section 57.

In a step 106E2, the movement calculated in the step 106E1 is added to the gravity center coordinates and the positional coordinates of each of the constitutional elements of the measuring device 21 listed in the panel information stored in the storing section 55. Therefore, the panel information of the measuring device 21 is renewed to move the measuring device 21 according to the "translation movement" operation. The procedure of the step 106E2 is performed in the positioning section 57b.

In a step 106E3, the movement calculated in the step 106E1 is added to the positional coordinates listed in the distance display window information stored in the storing section 55. Therefore, the distance display window information is renewed to move the distance display window 27 according to the "translation movement" operation. The procedure of the step 106E3 is performed in the positioning section 57b.

In cases where it is judged in the step 106A that the type of the motion mode is the "transformation", the procedure proceeds to a step 106F1 shown in FIG. 18B. In the step 106F1, because the mouse 28 is moved by the operator after the left mouse button 30 is pushed down to set the motion mode to the "transformation", the movement of the mouse cursor 29 moved with the mouse 28 is obtained by calculating a difference between the current coordinates of the mouse cursor 29 and the preceding coordinates of the mouse cursor 29 listed in the mouse information.

In a step 106F2, an edge denoted by the element data stored in the element data field of the motion message is found out from the panel information as a designated edge. Also, an opposite edge of an opposite panel which is coupled to another panel designated by the mouse cursor 29 is found out from the panel information. A difference in the positional coordinates between the designated edge and the opposite edge is equal to that in the gravity center coordinates between the coupled panels. Thereafter, the movement calculated in the step 106F1 is added to the positional coordinates of the designated and opposite edges to move the designated and opposite edges according to the "transformation" operation.

In a step 106F3, the positional coordinates of each of the other edges listed in the panel information are renewed to match with the positional coordinates of the designated and opposite edges transformed. Also, the positional coordinates of each of the panels listed in the panel information are renewed to match with the positional coordinates of the designated and opposite edges.

In the renewing section 59, the structural data of the measuring device 21 are renewed according to the selection of the binding mode, the editing mode, and/or the axial attribute in the step 107. The procedure of the step 107 is shown in FIGS. 20A, 20B in detail.

Figure 20A:
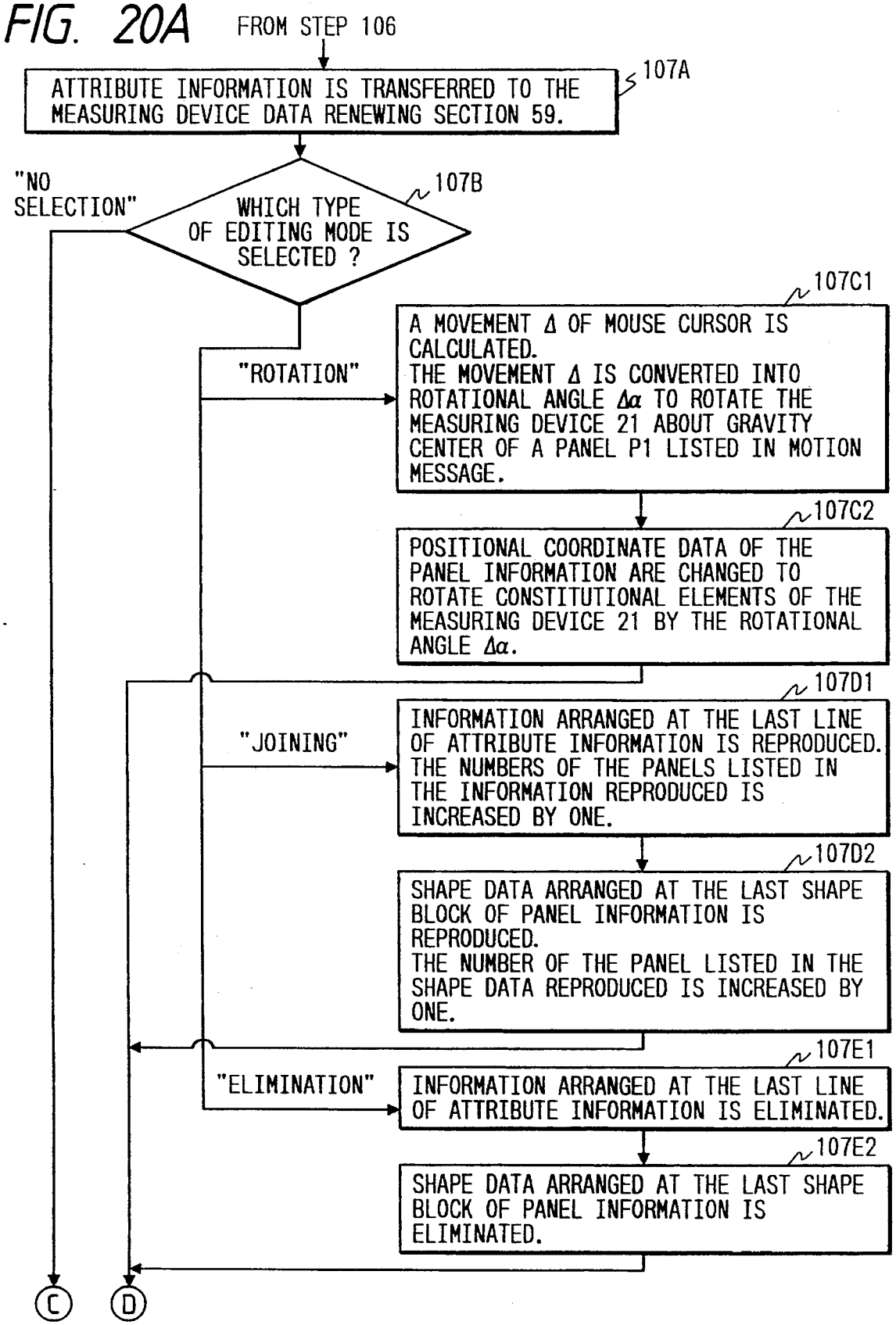
FIGS. 20A, 20B are a flow chart showing details of a step 107 shown in FIG. 8, the flow chart being used for the first to fourth embodiments.

As shown in FIG. 20A, in a step 107A, the attribute information of the measuring device 21 stored in the storing section 55 is transferred to the renewing section 59.

In a step 107B, it is judged which type of editing mode is selected in the attribute information. In cases where a type of editing mode listed in the attribute information is selected in the selecting section 54, the structural data of the measuring device 21 stored in the storing section 55 are renewed in the renewing section 59 to perform the "rotation" operation, the "joining" operation or the "elimination" operation for the measuring device 21. The procedure of the renewal of the structural data in the "rotation" operation, the "joining" operation and the "elimination" operation is described in a second embodiment. In cases where any type of edition mode is not selected, the procedure proceeds to a step 107F.

Figure 20B:
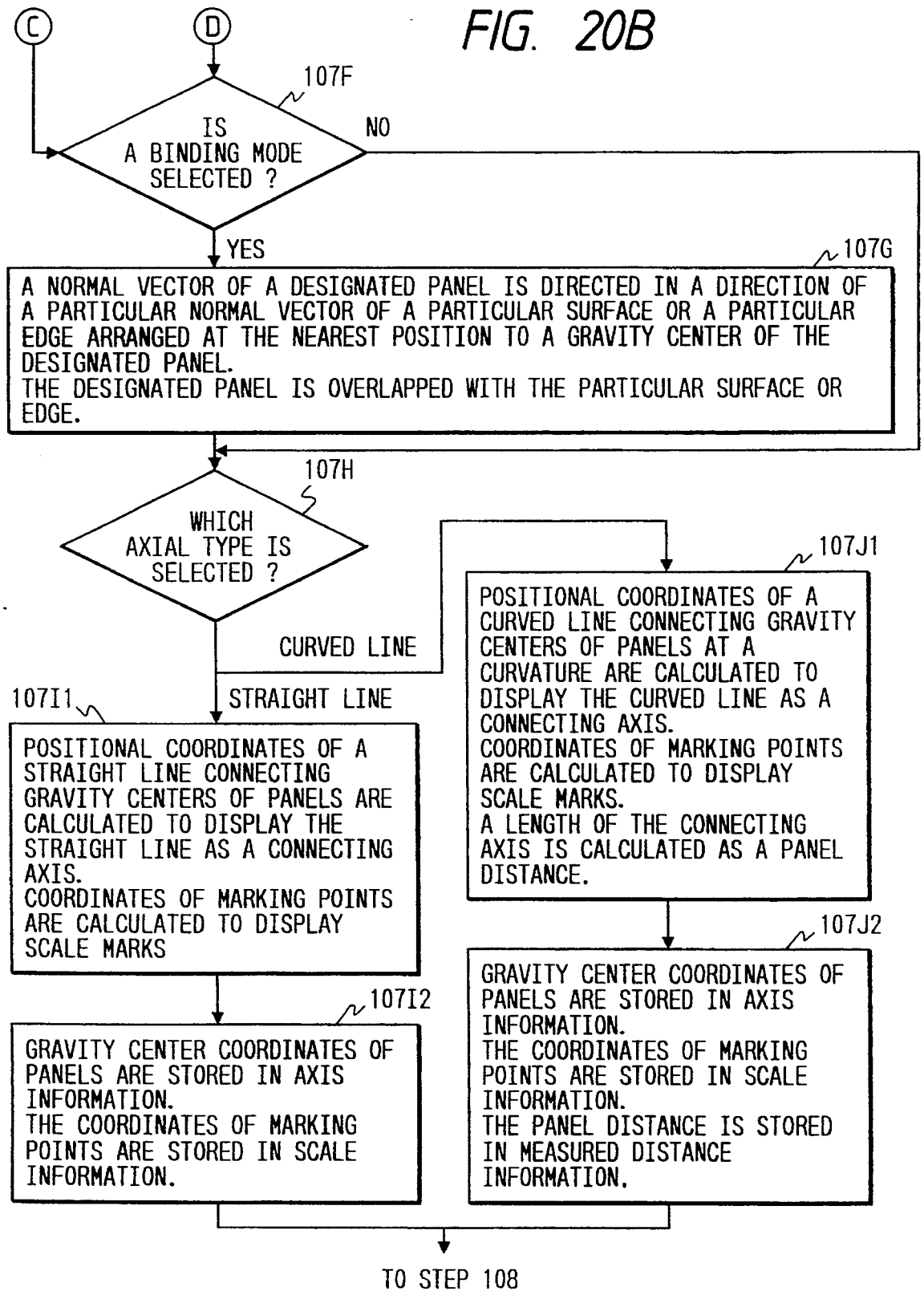

In the step 107F shown in FIG. 20B, it is judged whether or not the binding mode is selected in the attribute information. The procedure performed when the binding mode is selected is described in a third embodiment. When the binding mode is not selected, the procedure proceeds to a step 107H.

In the step 107H, it is judged which type of axial attribute of the axial 23 is selected in the attribute information. When the type of the axial attribute selected is a curved line, the procedure is described in a fourth embodiment. When the type of the axial attribute selected is a straight line, the procedure proceeds to a step 10711.

In the step 10711, a pair of first and second panels 25, 26 connected to the connecting axis 23 are found out from the attribute information, and the gravity center coordinates of each of the panels 25, 26 are found out from the panel information. Thereafter, pieces of positional data denoting positional coordinates of a straight line which connects the gravity center coordinates of the panels 25, 26 are calculated to display the straight line as the connecting axis 23. Also, coordinates of each of marking points arranged on the connecting axis 23 at regular intervals are calculated to obtain the coordinate data of the scale marks.

In a step 10712, the gravity center coordinates of the first panel 25 are stored in the axis information field as the first coordinates of the connecting axis 23, and the gravity center coordinates of the second panel 25 are stored in the axis information field as the second coordinates of the connecting axis 23. Therefore, the axis information is formed. Also, the coordinates of the marking points are stored in the scale information field as the coordinate data of the scale marks. Therefore, the scale information is formed.

In the distance calculating section 60, a difference between the gravity center coordinates of the first panel 25 and the gravity center coordinates of the second panel 26 listed in the axis information of the storing section 55 is calculated in the step 108, and the difference calculated is stored in the measured distance information field as the panel distance. Therefore, even though the distance between the panels 25, 26 is changed according to the motion mode "extension" or "shortening", the distance can be immediately shown.

In the display processing section 61, the solid figures are displayed in the figure display region 22a in the step 109 by utilizing the figure element data of the solid figures stored in the storing section 58. Also, the measuring device 21 is displayed in the figure display region 22a in cases where the display mode listed in the attribute information of the storing section 55 shown in FIG. 10 is in the "on" condition. The procedure of the step 109 is shown in FIG. 21 in detail.

Figure 21:
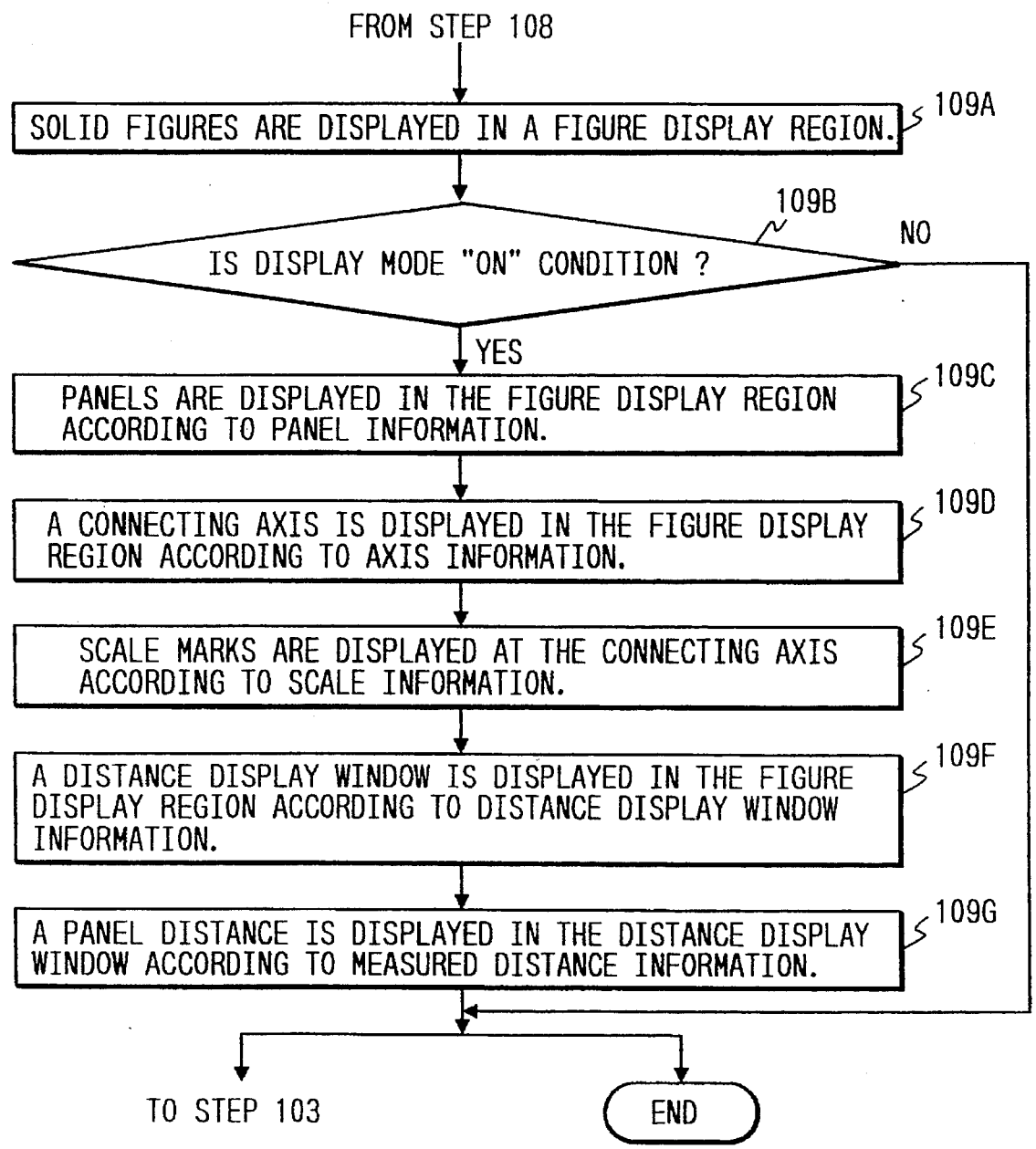
FIG. 21 is a flow chart showing details of a step 109 shown in FIG. 8.

As shown in FIG. 21, in a step 109A, the solid figures are displayed in the figure display region 22a by utilizing the figure element data of the solid figures stored in the storing section 58.

In a step 109B, it is judged whether or not the display mode is in the "on" condition. In cases where the display mode is in the "on" condition, the procedure proceeds to a step 109C.

In the step 109C, the first and second panels 25, 26 are displayed in the figure display region 22a according to the panel information transferred from the renewing section 59.

In a step 109D, the connecting axis 23 is displayed in the figure display region 22a according to the axis information transferred from the renewing section 59.

In a step 109E, the scale marks 24 of the connecting axis 23 are displayed at the connecting axis 23 according to the scale information transferred from the renewing section 59.

In a step 109F, the distance display window 27 is displayed in the figure display region 22a according to the distance display window information transferred from the renewing section 59.

In a step 109G, the panel distance is displayed in the distance display window 27 according to the measured distance information transferred from the calculating section 60.

Therefore, the measuring device 21 provided with the first and second panels 25, 26 and the connecting axis 23 are displayed, and the panel distance is displayed in the distance display window 27 attached to the first or second panel.

Accordingly, in cases where the operator intends to measure a figure distance between a starting point of a solid figure and an ending point of the solid figure (or another solid figure), when the first panel 25 is positioned at the starting point and the second panel 26 is positioned at the ending point, the figure distance can be rapidly measured in a simple operation.

Also, because positions of the first and second panels 25, 26 can be arbitrarily set even though any figure element of the solid figure does not exist at the positions, the operator can measure a distance between two positions regardless of whether a figure element exist at the positions. Therefore, the operator can draw solid figures while confirming a distance between two positions of one or more figures at which any figure element does not exist. Also, the operator can measure a distance between two positions of a surface hidden at a reverse side of a solid figure.

In the first embodiment, the second panel 26 coupled to the first panel 25 designated by the mouse cursor 29 is moved according to the motion mode "extension" or "shortening". However, it is applicable that the first panel 25 designated by the mouse cursor 29 be moved according to the motion mode "extension" or "shortening".

Second Embodiment

In the second embodiment, the operation performed by selecting the editing mode is described.

In the editing mode, there are three types of operations such as "rotation", "joining" and "elimination". The measuring device 21 is rotated in the figure display region 22a in the "rotation" operation. An additional measuring device is jointed to the measuring device 21 in the "joining" operation. An unnecessary measuring device is eliminated from a unit of jointed measuring devices 21a, 21b,—in the "elimination" operation.

FIGS. 22A to 22D show the measuring device 21 rotated according to the "rotation" operation.

As shown in FIG. 22A, a measuring device 21 having a first panel P1 and a second panel P2 is initially displayed according to the first embodiment. When the operator pushes down the left mouse button 30 of the mouse 28 after the editing mode area 43 of the measuring device attribute region 22b shown in FIG. 5 is designated by the mouse cursor 29, an editing menu consisting of "rotation", "joining", "elimination" and "no selection" is displayed in the region 22b. Thereafter, when the operator pushes down the left mouse button 30 after the editing menu "rotation" is designated by the mouse cursor 29, the position of the mouse cursor 29 is read in the selecting section 54, and the editing menu "rotation" is stored in the storing section 55. That is, the editing menu "rotation" is selected.

Thereafter, as shown in FIG. 22B, the mouse cursor 29 is positioned at the first panel P1 of the measuring device 21, and the operator pushes down the left mouse button 30. Therefore, the position of the mouse cursor 29 is read in the reading section 52, and the first panel P1 of the measuring device 21 rotated according to the "rotation" operation is emphatically displayed by the function of the display processing section 61.

Thereafter, as shown in FIG. 22C, when the operator moves the mouse 28 while pushing down the left mouse button 30, a translation movement of the mouse cursor 29 moving with the mouse 28 is read in the reading section 52, and the structural data of the measuring device 21 is renewed in the renewing section 59 to change the translation movement of the mouse cursor 29 to a rotational movement of the measuring device 21. In this case, a rotational center of the rotational movement is the gravity center of the first panel 25 designated by the mouse cursor 29. Therefore, the measuring device 21 rotated about the rotational centers according to the rotational movement is displayed in the figure display region 22a by the function of the display processing section 61.

Thereafter, as shown in FIG. 22D, when the operator stops pushing down the left mouse button 30, the rotational movement of the measuring device 21 is finished.

Figure 23A:
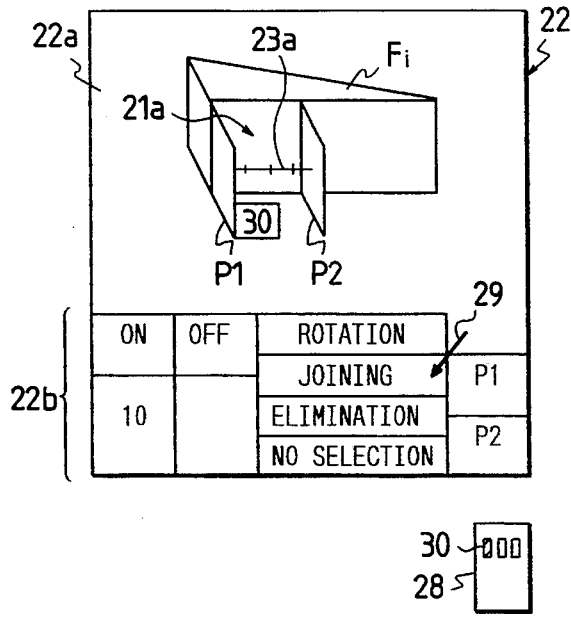
FIGS. 23A, 23B show a third panel additionally joining to a measuring device by performing a "joining" operation shown in FIG. 20A according to the second embodiment of the present invention.
Figure 23B:
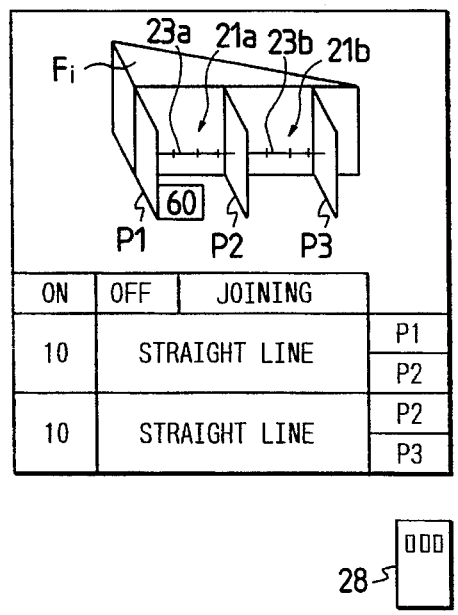

FIGS. 23A, 23B show the addition of a third panel according to the "joining" operation.

As shown in FIG. 23A, a measuring device 21a consisting of first and second panels P1, P2 and a first connecting axis 23a is displayed according to the first embodiment. Thereafter, the editing menu "joining" is designated by the mouse cursor 29 after the editing menu is displayed. Thereafter, when the operator pushes down the left mouse button 30, the position of the mouse cursor 29 is read in the selecting section 54, and the editing menu "joining" is stored in the storing section 55. That is, the editing menu "joining" is selected. Therefore, as shown in FIG. 23B, a third panel P3 is additionally joined to the measuring device 21a. The structural data of the third panel P3 is calculated in the renewing section 59. Therefore, a jointed measuring device 21b having the second panel P2 and the third panel P3 is additionally formed. In this case, the panel distance displayed in the distance display window 27 denotes a distance between the first and third panels. Also, the attributes of a second connecting axis 23b of the jointed measuring device 21b and the second and third panel P2, P3 connected to the second connecting axis 23b are displayed in the attribute region 22b by the function of the display processing section 61.

Figure 24A:
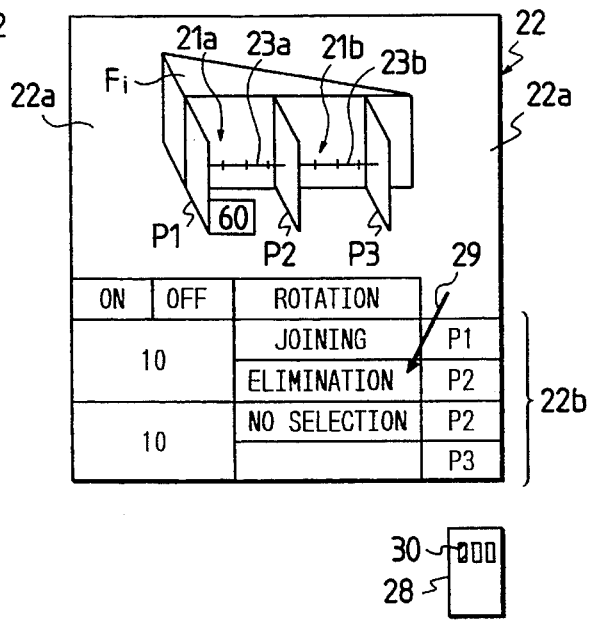
FIGS. 24A, 24B show a third panel eliminated from a pair of measuring device by performing a "elimination" operation shown in FIG. 20A according to the second embodiment of the present invention.
Figure 24B:
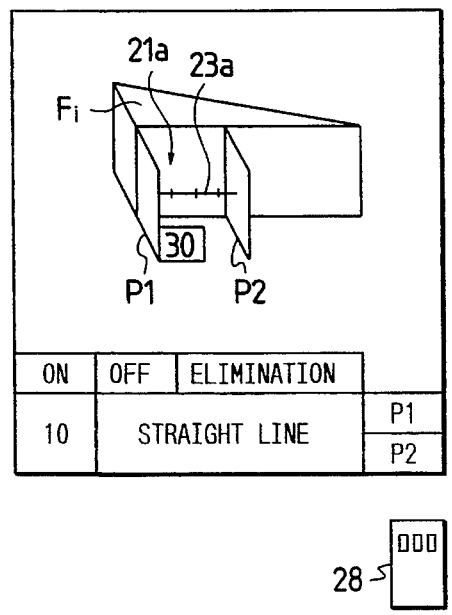

FIGS. 24A, 24B show the elimination of a third panel according to the "elimination" operation.

As shown in FIG. 24A, a unit of the measuring devices 21a, 21b are displayed according to the "joining" operation. Thereafter, the editing menu "elimination" is designated by the mouse cursor 29 after the editing menu is displayed. Thereafter, when the operator pushes down the left mouse button 30, the position of the mouse cursor 29 is read in the selecting section 54, and the editing menu "elimination" is stored in the storing section 55. That is, the editing menu "elimination" is selected. Therefore, as shown in FIG. 24B, the third panel P3 and the second connecting axis 23b are eliminated. That is, the structural data of the third panel P3 and the second connecting axis 23b are deleted in the renewing section 59.

Next, the procedure for performing the "rotational" operation, the "joining" operation and the "elimination" operation is described with reference to FIG. 20 in detail.

As shown in FIG. 20, when the editing mode "rotation" is selected in the selecting section 54, the procedure proceeds to a step 107C1.

In the step 107C1, a movement $\Delta=(dx,dy,dz)$ of the mouse cursor 29 moving with the mouse 28 is obtained by calculating a difference between the current coordinates of the mouse cursor 29 and the preceding coordinates of the mouse cursor 29 listed in the mouse information of the storing section 53 shown in FIG. 15A. Thereafter, as shown in FIG. 25, the movement $\Delta$ of the mouse cursor 29 is converted into a rotational angle $\Delta\alpha$ at which the measuring device 21 is rotated about the gravity center of a panel P1 listed in the motion message of the storing section 53 shown in FIG. 15A according to a predetermined relationship between the movement of the mouse cursor 29 and the rotational angle. The procedure of the step 107C1 is performed in a measuring device rotating section 59a of the renewing section 59.

In a step 107C2, as shown in FIG. 25, all of the positional coordinate data listed in the panel information of the storing section 55 shown in FIG. 10 are changed to rotate the constitutional elements of the measuring device 21 by the rotational angle $\Delta\alpha$ converted. The procedure of the step 107C2 is performed in the rotating section 59a.

When the editing mode "joining" is selected in the selecting section 54, the procedure proceeds to a step 107D1.

In the step 107D1, the information of the connecting axis 23 arranged at the last line of the attribute information is reproduced, and the numbers of the panels listed in the information reproduced are respectively increased by one. Thereafter, the information reproduced is added to the attribute information. For example, as shown in FIG. 26, in cases where the number P1 of the first panel and the number P2 of the second panel are listed in the information arranged at the last line, a piece of information including the number P2 of the second panel and the number P3 of a third panel is added. The procedure of the step 107D1 is performed in a measuring device joining section 59b of the renewing section 59.

In a step 107D2, the shape data S2 arranged at the last shape block of the panel information is reproduced to produce a piece of additional shape data S3, and the number of the panel listed in the additional shape data S3 is increased by one. Thereafter, the additional shape data S3 is added to the panel information. In this case, as shown in FIG. 26, gravity center coordinates in the additional shape data S3 are determined by adding a difference $\Delta=(xg_2-xg_1, yg_2-yg_1, zg_2-zg_1)$ in the gravity center coordinates between the first and second panel P1, P2 to the gravity center coordinates $(xg_2,yg_2,zg_2)$ of the second panel P2. Also, positional coordinates in the additional shape data are determined by adding a difference $\Delta=(x_{2i}-x_{1i},y_{2i}-y_{1i},z_{2i}-z_{1i})$ in the positional coordinates between the first and second panel P1, P2 to the positional coordinates $(x_{2i},y_{2i},z_{2i})$ of the second panel P2. In addition, an original panel distance listed in the measured distance information is changed to an altered panel distance of which a value is determined by adding a panel difference between the second and third panels to the original panel distance. The procedure of the step 107D2 is performed in the joining selection 59b.

When the editing mode "elimination" is selected in the selecting section 54, the procedure proceeds to a step 107E1.

In the step 107E1, the information of the connecting axis 23 arranged at the last line of the attribute information is eliminated from the attribute information, as shown in FIG.

26.

In a step 107E2, the shape data arranged at the last shape block of the panel information is eliminated from the panel information. Also, an original panel distance listed in the measured distance information is changed to an altered panel distance between the first and second panels.

Figure 27:
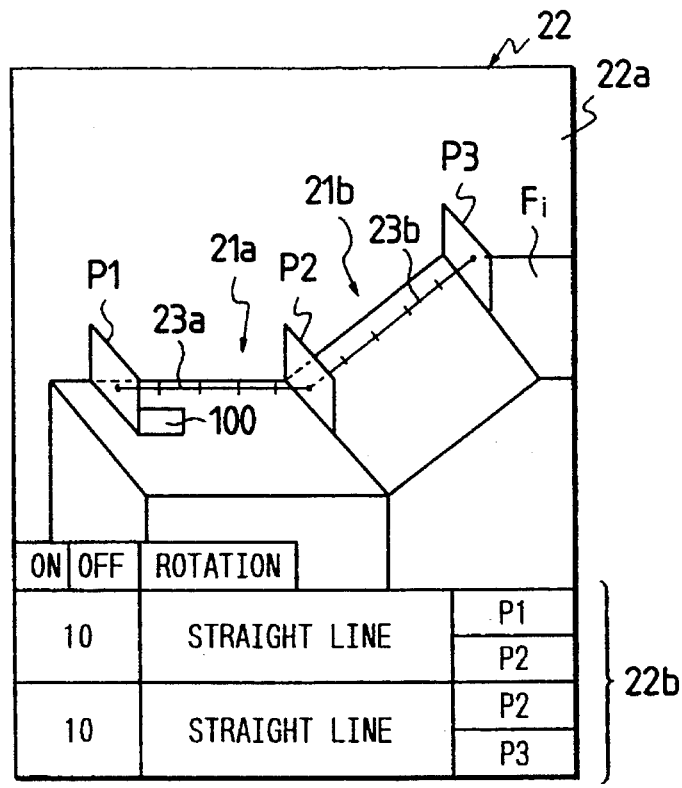
FIG. 27 shows a combinated example of the first and second embodiments executed to emphasize the effect of the second embodiment.

A combinated example of the first and second embodiments is described to emphasize the effect of the second embodiment with reference to FIG. 27.

The editing mode "joining" is selected to generate a measured device 21b consisting of the second and third panels P2, P3 and a second connecting axis 23b in a first step. Thereafter, the connecting axis 23b is extended or shortened according to the motion mode "extension" or "shortening" of the first embodiment in a second step. Thereafter, the measured device 21b is rotated about the gravity center of the second panel P2 according to the editing mode "rotation". Therefore, as shown in FIG. 27, even though a surface of a solid figure is not flat, a distance from a first point A to a third point C through a second point B can be measured.

Accordingly, even though the shape of the solid figure is complicated, a distance of a bending line along the surface of the solid figure can be easily measured.

Also, in cases where the editing mode "joining" is repeatedly selected, the number of measuring devices can be set to more than two.

Third Embodiment

In the third embodiment, the operation performed by selecting the binding mode is described.

FIGS. 28A to 28D show the measuring device 21 of which a panel is overlapped with a figure element of a solid figure according to the "binding" operation.

Figure 28A:
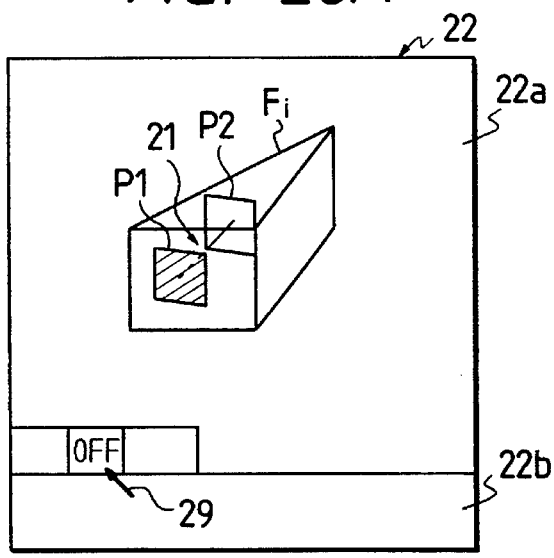
FIGS. 28A to 28D show a measuring device of which a panel is overlapped with a figure element of a solid figure by performing a "binding" operation shown in FIG. 20B according to the second embodiment of the present invention.

As shown in FIG. 28A, a measuring device 21 having a first panel P1 and a second panel P2 is initially displayed according to the first embodiment. In this case, the first panel P1 is emphatically displayed by the operation of the motion mode "element designation" in the step 104F. Thereafter, the binding mode area 42 of the measuring device attribute region 22b shown in FIG. 5 is designated by the mouse cursor 29 on condition that the binding mode is in the "off" condition. Thereafter, when the operator pushes down the left mouse button 30 of the mouse 28, the binding mode is changed to the "on" condition. That is, as shown in FIG. 28B, the binding mode is selected, and the measuring device 21 is moved toward a surface S1 of a solid figure Fi to overlap the first panel P1 of the measuring device 21 with the surface S1. In this case, the surface S1 is arranged at the nearest position of the first panel P1 as compared with other surfaces of the solid figure.

Figure 28C:
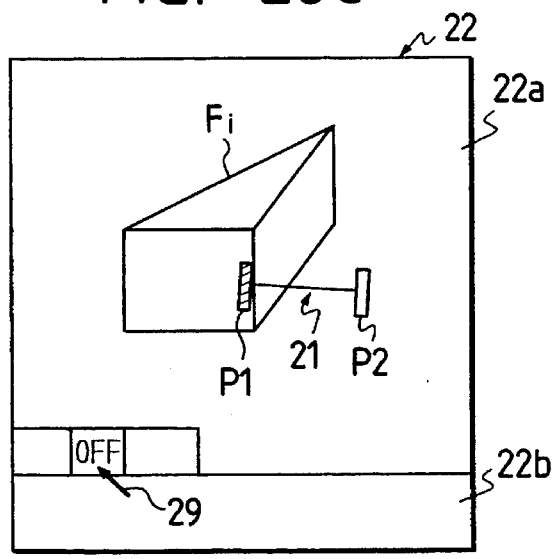
Figure 28B:
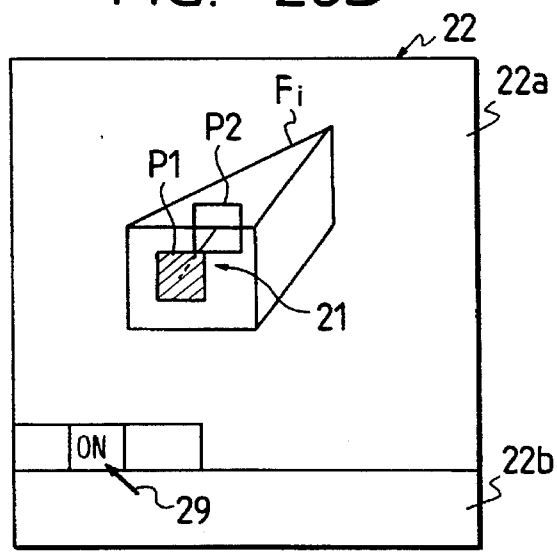
Figure 28D:
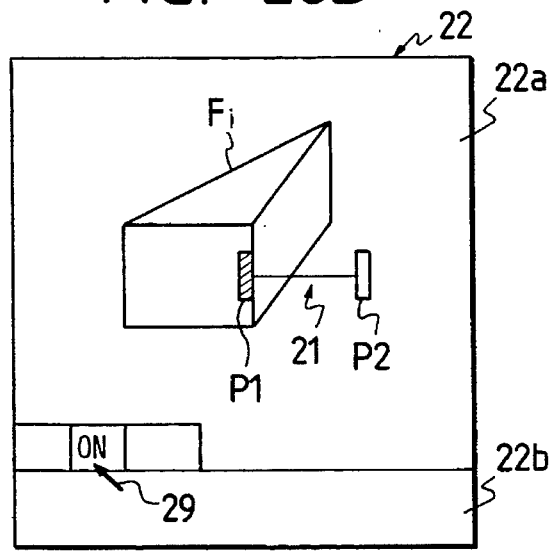

Also, as shown in FIG. 28C, in cases where the first and second panels P1, P2 are transformed in a stick shape like a straight line by the operation of the motion mode "transformation" performed in the steps 106F1 to 106F3, the binding mode area 42 is designated by the mouse cursor 29 on condition that the binding mode is in the "off" condition. Thereafter, when the operator pushes down the left mouse button 30 of the mouse 28, the binding mode is changed to the "on" condition. That is, as shown in FIG. 28D, the binding mode is selected, and the measuring device 21 is moved toward an edge E1 of a solid figure Fi to overlap the first panel P1 of the measuring device 21 with the edge E1. In this case, the edge E1 is arranged at the nearest position of the first panel P1 as compared with other edges of the solid figure Fi.

The procedure for renewing the structural data of the measuring device 21 in the renewing section 59 to move the measuring device 21 according to the binding mode is described in detail with reference to FIG. 20B. In this case, a panel emphatically displayed by the operation of the motion mode "element designation" is called a designated panel.

As shown in FIG. 20B, in cases where the binding mode is selected, it is judged in the step 107F that the binding mode is selected, and the procedure proceeds to a step 107G.

In the step 107G, the figure element data of the solid figure Fi are transferred from the storing section 58 to the renewing section 59. Thereafter, the figure element data are compared with the structural data of the measuring device 21 transferred to the renewing section 59 in the step 107A, and a particular surface of the solid figure Fi arranged at the nearest position to the gravity center of the designated panel is selected from the surfaces of the solid figure Fi. Thereafter, the structural data of the measuring device 21 is renewed in the renewing section 59 to direct the normal vector of the designated panel in a direction of a particular normal vector of the particular surface. Thereafter, the structural data of the measuring device 21 is renewed in the renewing section 59 to overlap the designated panel with the particular surface. The procedure of the step 107G is controlled in a measuring device binding section 59c of the renewing section 59.

Also, in cases where the designated panel and a paired panel coupled to the designated panel are almost transformed in a stick shape like a straight line, a particular edge of the solid figure Fi arranged at the nearest position to the gravity center of the designated panel is selected from the edges of the solid figure Fi. Thereafter, the structural data of the measuring device 21 is renewed in the renewing section 59 to direct the normal vector of the designated panel in a direction perpendicular to an extending direction of the particular edge. Thereafter, the structural data of the measuring device 21 is renewed in the renewing section 59 to overlap the designated panel with the particular edge.

Accordingly, because the designated panel is overlapped with a figure element of a solid figure in a simple operation, a distance between a figure element of a solid figure and a regular position of the solid figure can be easily measured.

In the third embodiment, the designated panel emphatically displayed is overlapped with the particular surface or the particular edge. However, it is applicable that the paired panel not emphatically displayed be overlapped with the particular surface or the particular edge.

Also, a surface or an edge arranged at the nearest position to the gravity center of the designated panel is selected to be overlapped with the designated panel. However, it is applicable that a surface or an edge arranged at the nearest position to a middle point of the designated and paired panels be selected as the particular surface or the particular edge.

Fourth Embodiment

In the fourth embodiment, the operation in which the connecting axis 23 is curved is described.

FIGS. 29A to 29D show the change of a straight axis to a curved axis displayed in cases where a curved line is selected as the axis type.

Figure 29A:
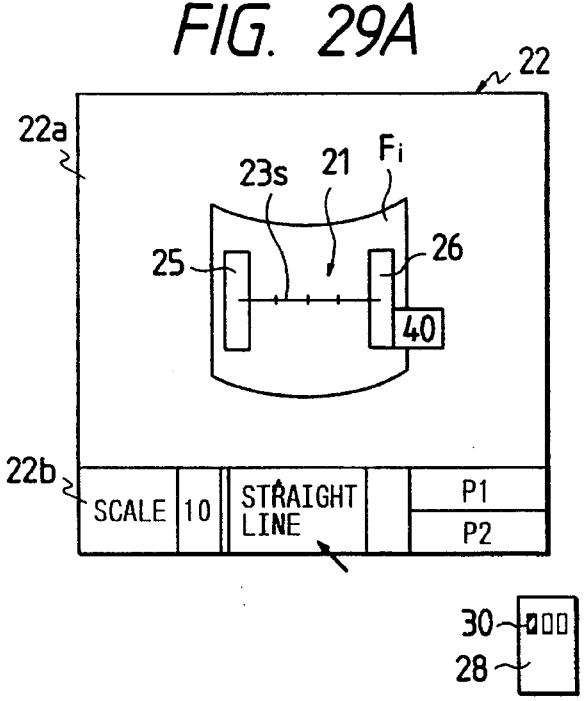
FIGS. 29A to 29D show the change of a straight axis to a curved axis displayed in cases where a curved line is selected as an axis type.

As shown in FIG. 29A, a measuring device 21 having first and second panels 25, 26 and a straight axis 23s is initially displayed in the figure display region 22a according to the first embodiment. When the left mouse button 30 is pushed down after the axis attribute setting area 45 is designated by the mouse cursor 29, the display of a "straight line" is changed to a "curved line" as shown in FIG. 29B, and an initial value denoting a curvature of the connecting axis 23 is displayed in the curvature selecting area 46. Also, a curved axis 23c having the curvature of the initial value is displayed in the figure display region 22a in place of the straight axis 23s. In addition, a length of the curved axis 23c is displayed in the distance display window 27 as the panel distance.

Figure 29C:
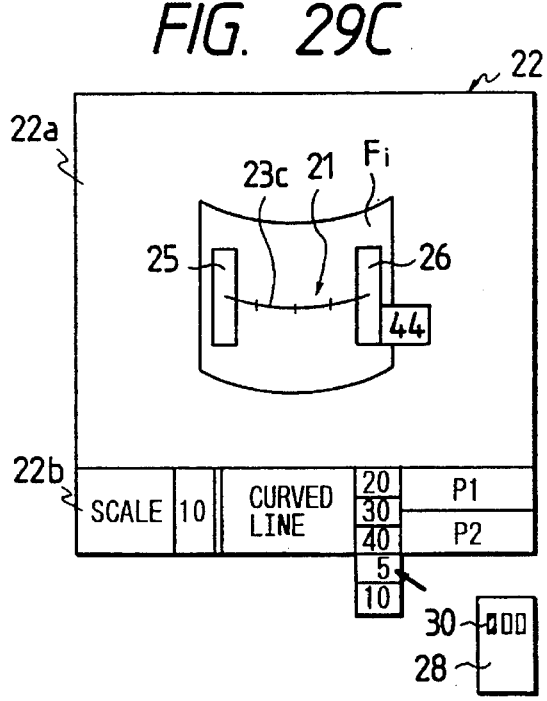
Figure 29B:
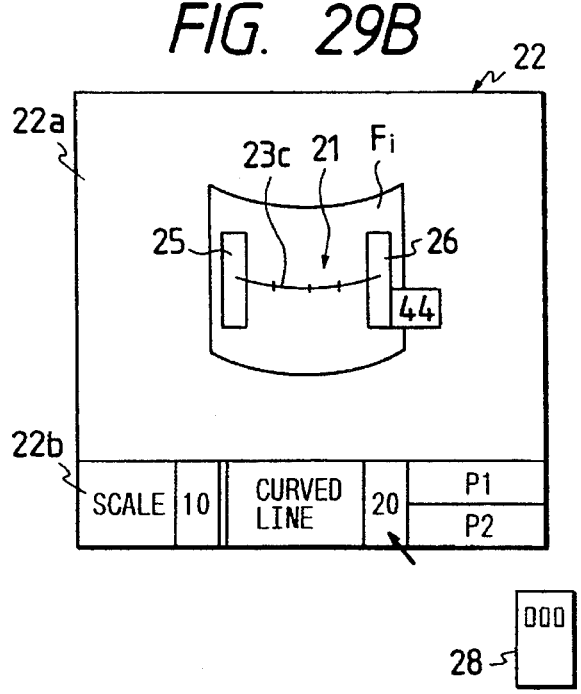
Figure 29D:
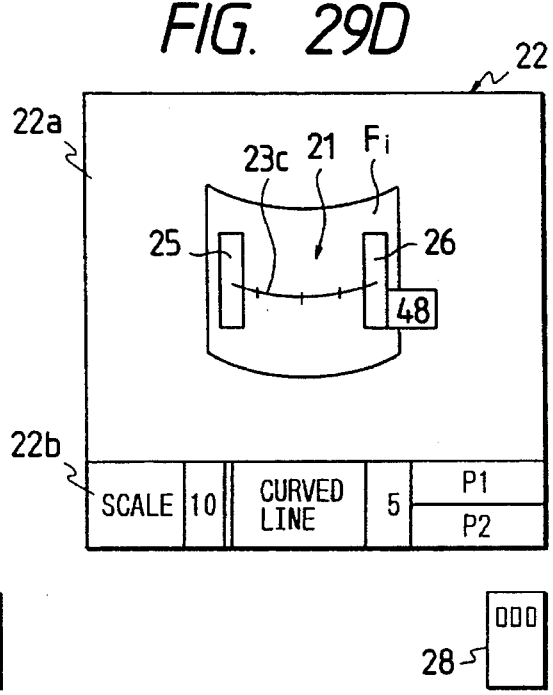

Thereafter, when the left mouse button 30 is pushed down after the curvature selecting area 46 is designated by the mouse cursor 29, several curvatures are displayed in the area 46, as shown in FIG. 29C. Thereafter, when the left mouse button 30 is pushed down after a particular curvature is designated by the mouse cursor 29, the particular curvature designated is selected as the curvature of the curved axis 23c. Therefore, as shown in FIG. 29D, the curvature of the curved axis 23c displayed in the region 22a is changed to the particular curvature, and an altered length of the curved axis 23c having the particular curvature is displayed in the distance display window 27 as the panel distance.

The procedure for renewing the structural data of the measuring device 21 in the renewing section 59 to curve the connecting axis 23 by a particular curvature with reference to FIG. 20B.

As shown in FIG. 20B, in cases where the curved line is set as the axial type of the connecting axis 23, it is judged in the step 107H that the axial type is set to the curved line, and the procedure proceeds to a step 107J1.

In the step 107J1, a pair of first and second panels 25, 26 connected to the connecting axis 23 are found out from the the attribute information, and the gravity center coordinates of each of the panels 25, 26 are found out from the panel information. Thereafter, pieces of positional data denoting positional coordinates of a curved line which are curved at the particular curvature and connects the gravity center coordinates of the panels 25, 26 are calculated to display the curved line as the connecting axis 23. Also, coordinates of each of points arranged on the connecting axis 23 at regular intervals are calculated to obtain the coordinate data of the scale marks. In addition, a length of the connecting axis 23 having the particular curvature is calculated as the panel distance. The procedure of the step 107J1 is performed in an axial curving section 59d of the renewing section 59.

In a step 107J2, the gravity center coordinates of the first panel 25 are stored in the axis information field as the first coordinates of the connecting axis 23, and the gravity center coordinates of the second panel 25 are stored in the axis information field as the second coordinates of the connecting axis 23. Therefore, the axis information is formed. Also, the coordinates of the points are stored in the scale information field as the coordinate data of the scale marks. Therefore, the scale information is formed. In addition, the panel distance is stored in the measured distance information field. Therefore, the measured distance information is formed.

Accordingly, even though a solid figure has a curved surface, a distance along the curved surface can be easily measured by curving the connecting axis 23.

Figure 30:
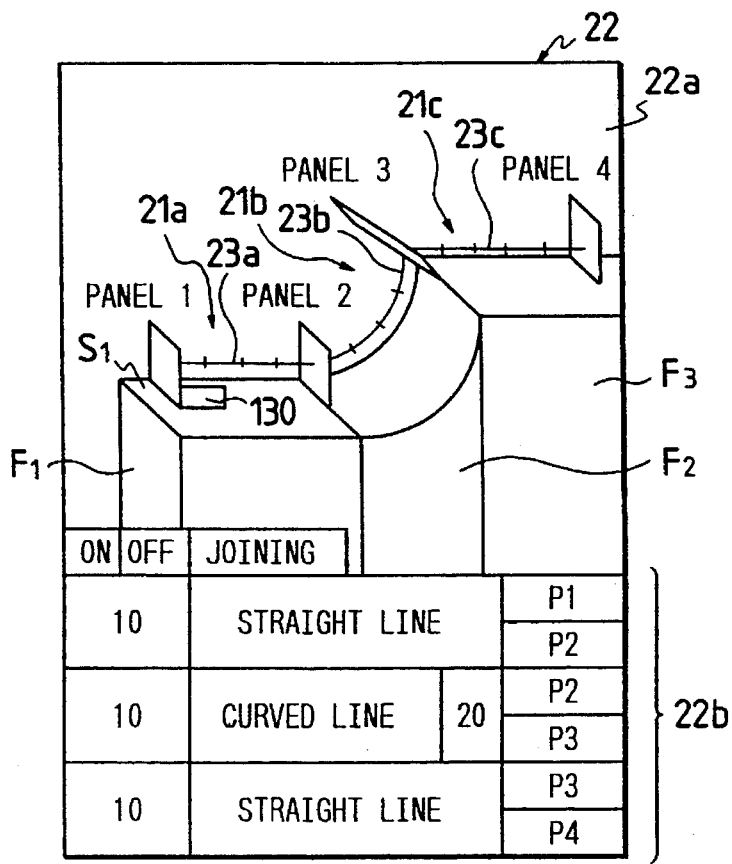
FIG. 30 shows a combinated example of the first to fourth embodiments executed to emphasize the effect of the third and fourth embodiments.

A combinated example of the first to fourth embodiments is described to emphasize the effect of the third and fourth embodiments with reference to FIG. 30.

As shown in FIG. 30, a first solid figure F1 has a flat surface S1, a second solid figure F2 has a curved surface S2, and a third solid figure F3 has a flat surface S3. In the combined example, a distance of a route along shapes of the first to third solid figures is measured according to the first to fourth embodiments. The route is started from a first point on the first surface F1, passes through a second point positioned at a boundary between the first and second surfaces S1, S2 and a third point positioned at a boundary between the second and third surfaces S1, S2 and is ended to a fourth point on the third surface S3.

Initially, a first measuring device 21a consisting of first and second panels P1, P2 and a first connecting axis 23a is displayed on the first surface S1 according to the first embodiment. In this case, the second panel P2 is emphatically displayed. Thereafter, the second panel P2 is positioned at the second point by selecting the binding mode according to the third embodiment, and the first panel P1 is positioned at the first point by selecting the motion mode "extension" or "shortening" according to the first embodiment.

Thereafter, a second measuring device 21b consisting of the second and third panels P2, P3 and a second connecting axis 23b is jointed to the first measuring device 21a by selecting the editing mode "jointing" according to the second embodiment. Thereafter, the third panel P3 is rotated by a regular angle about the gravity center of the second panel P2 by selecting the editing mode "rotation" according to the second embodiment, and the second connecting axis 23b is lengthened or shortened by selecting the motion mode "extension" or "shortening" according to the first embodiment to position the third panel P3 at the third point. Thereafter, the second connecting axis 23b is curved by setting the axial type of the second connecting axis 23b to a curved line having a particular curvature. Therefore, the second connecting axis 23b extends along the curved surface S2.

Thereafter, a third measuring device 21c consisting of the third and fourth panels P3, P4 and a third connecting axis 23c is jointed to the first measuring device 21a by selecting the editing mode "jointing" according to the second embodiment. Thereafter, the fourth panel P4 is rotated by a regular angle about the gravity center of the third panel P3 by selecting the editing mode "rotation" according to the second embodiment to position the fourth panel P4 on the third surface S3. Thereafter, the third connecting axis 23c is lengthened or shortened by selecting the motion mode "extension" or "shortening" according to the first embodiment to position the fourth panel P4 at the fourth point.

Thereafter, a total length obtaining by adding a length of the first connecting axis 23a, a length of the second connecting axis 23b, and a a length of the third connecting axis 23c is displayed in the distance display window 27.

Accordingly, even though one or more solid figures have complicated shapes, a distance along the complicated shapes can be easily measured according to the first to fourth embodiments.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A solid figure distance measuring apparatus comprising:

measuring device data storing means for storing pieces of three-dimensional structural data of a measuring device which includes a piece of three-dimensional length data denoting a three-dimensional length of the measuring device and a piece of three-dimensional positional data denoting a three-dimensional position of the measuring device, the three-dimensional length of the measuring device being represented by a three-dimensional element distance between a first constitutional element of the measuring device and a second constitutional element of the measuring device;

solid figure data storing means for storing pieces of three-dimensional figure element data denoting three-dimensional shapes of a plurality of figure elements of a solid figure;

displaying means for displaying the solid figure in a display screen according to pieces of three-dimensional figure element data stored in the solid figure data storing means and displaying the measuring device in the display screen according to pieces of three-dimensional structural data of the measuring device stored in the measuring device data storing means;

measuring device positioning means for positioning the first constitutional element of the measuring device displayed by the displaying means at a first point on the display screen while changing the piece of three-dimensional positional data stored in the measuring device data storing means;

measuring device extending or shortening means for extending or shortening the three-dimensional length of the measuring device, of which the first constitutional element is positioned at the first point by the measuring device positioning means, to set the second constitutional element of the measuring device displayed by the displaying means at a second point on the display screen while changing the piece of three-dimensional length data stored in the measuring device data storing means; and figure distance calculating means for calculating the three-dimensional length of the measuring device which is extended or shortened in the measuring device extending or shortening means, the three-dimensional length of the measuring device calculated by the figure distance calculating means being displayed in the display screen by the displaying means as a figure distance between a first figure element of the solid figure placed at the first point and a second figure element of the solid figure placed at the second point.

2. An apparatus according to claim 1 in which the measuring device is composed of a connecting axis, the first constitutional element consisting of a first flat panel which is connected to one end of the connecting axis and is moved in a three-dimensional space by the measuring device positioning means, the second constitutional element consisting of a second flat panel which is connected to the other end of the connecting axis and is moved by the measuring device extending or shortening means to extend or shorten the connecting axis, and a distance display window in which a three-dimensional length of the connecting axis is numerically displayed as the three-dimensional length of the measuring device calculated in the figure distance calculating means.

3. An apparatus according to claim 2, additionally including:

axial curving means for curving the connecting axis of the measuring device, of which the first constitutional element is positioned at the first point on the display screen by the measuring device positioning means and the second constitutional element is set at the second point on the display screen by the measuring device extending or shortening means, along a curved outline of the solid figure displayed by the displaying means, a curved length of the connecting axis being calculated in the figure distance calculating means, and the curved length being displayed in the display screen by the display means as the figure distance.

4. An apparatus according to claim 3, additionally including curvature setting means for setting a particular axial curvature of the connecting axis curved by the axial curving means at an outline curvature of the solid figure to extend the connecting axis in parallel with the curved outline of the solid figure, the particular axial curvature of the connecting axis being selected from among a plurality of axial curvatures which are stored in the measuring device data storing means.

5. An apparatus according to claim 3, additionally including measuring device rotating means for rotating the measuring device around an arbitrary point on the display screen in a three dimensional space to direct a measuring line connecting the first and second constitutional elements of the measuring device in parallel with a measured line connecting the first and second points on the display screen, the three-dimensional length of the measuring device rotated in the measuring device rotating means being extended or shortened in the measuring device extending or shortening means.

6. An apparatus according to claim 1 additionally including:

measuring device rotating means for rotating the measuring device displayed by the displaying means around an arbitrary point on the display screen in a three dimensional space to direct a measuring line defined by connecting the first and second constitutional elements of the measuring device in parallel with a measured line defined by connecting the first and second points on the display screen while changing the positional data stored in the measuring device data storing means, the length of the measuring device rotated in the measuring device rotating means being extended or shortened in the measuring device extending or shortening means.

7. An apparatus according to claim 6 in which the measuring device is rotated about a gravity center of the first constitutional element by the measuring device rotating means to keep the first constitutional element positioned at the first point.

8. An apparatus according to claim 1, additionally including motion mode setting means for setting a motion mode to a translation movement in a three dimensional space to move the measuring device displayed by the displaying means according to the motion mode, the translation movement being performed for the measuring device to position the first constitutional element of the measuring device at the first point in the measuring device positioning means.

9. An apparatus according to claim 1, additionally including measuring device binding means for binding the first constitutional element of the measuring device positioned by the measuring device positioning means to the first figure element of the solid figure placed nearest to the first constitutional element to assist in positioning the first constitutional element.

10. An apparatus according to claim 1, additionally including:

motion mode setting means for setting a motion mode to a transformation mode in a three dimensional space to transform the first and second constitutional elements of the measuring device displayed by the displaying means in a stick shape according to the motion mode; and measuring device binding means for binding the first constitutional element of the measuring device positioned by the measuring device positioning means to an edge of the solid figure placed nearest to the first constitutional element to assist in positioning the first constitutional element, the edge of the solid figure being equivalent to the first figure element.

11. A solid figure distance measuring apparatus for measuring a figure distance between a first point of a solid figure and a second point of the solid figure in a three-dimensional space, comprising:

measuring device data storing means for storing pieces of structural data of a measuring device which include a piece of length data denoting a length of the measuring device and a piece of positional data denoting a position of the measuring device, the length of the measuring device being represented by an element distance between a first constitutional element of the measuring device and a second constitutional element of the measuring device;

solid figure data storing means for storing pieces of figure element data denoting shapes of a plurality of figure elements of the solid figure;

displaying means for displaying the solid figure in a display screen according to the pieces of figure element data stored in the solid figure data storing means and displaying the measuring device in the display screen according to the pieces of the three-dimensional structural data stored in the measuring device data storing means;

measuring device positioning means for positioning the first constitutional element of the measuring device displayed by the displaying means at the first point of the solid figure displayed by the displaying means while changing one or more pieces of the positional data stored in the measuring device data storing means;

measuring device extending or shortening means for extending or shortening the length of the measuring device, of which the first constitutional element is positioned at the first point by the measuring device positioning means, to set the second constitutional element of the measuring device displayed by the displaying means at the second point of the solid figure displayed by the displaying means while changing the length data stored in the measuring device data storing means;

figure distance calculating means for calculating the length of the measuring device which is extended or shortened in the measuring device extending or shortening means, the length of the measuring device calculated by the figure distance calculating means being displayed in the display screen by the display means as the figure distance; and measuring device joining means for joining a second measuring device to the measuring device to measure the figure distance through a third point of the solid figure positioned between the first and second points, pieces of second structural data of the second measuring device composed of a piece of second length data denoting a second length of the second measuring device and a piece of second positional data being additionally stored in the measuring device data storing means, the second length of the second measuring device being equal to a second element distance between the second constitutional element and a third constitutional element of the second measuring device, the measuring device being extended or shortened in the measuring device extending or shortening means to set the second constitutional element at the third point of the solid figure, the second measuring device being extended or shortened in the measuring device extending or shortening means to set the third constitutional element at the second point of the solid figure, a summed length of the length of the measuring device and the second length of the second measuring device being calculated in the figure distance calculating means, and the summed length being displayed in the display screen by the display means as the figure distance.

12. An apparatus according to claim 11, additionally including measuring device rotating means for rotating the measuring device to direct a first measuring line connecting the first and second constitutional elements of the measuring device in parallel with a first measured line connecting the first and third points of the solid figure or rotating the second measuring device to direct a second measuring line connecting the second and third constitutional elements of the second measuring device in parallel with a second measured line connecting the second and third points of the solid figure.

13. A method for measuring a figure distance, comprising the steps of:

storing pieces of three-dimensional structural data of a measuring device which include a piece of three-dimensional length data denoting a three-dimensional length of the measuring device and a piece of three-dimensional positional data denoting a three-dimensional position of the measuring device in a measuring device data storing section, the three-dimensional length of the measuring device being represented by a three-dimensional element distance between a first constitutional element of the measuring device and a second constitutional element of the measuring device;

storing pieces of three-dimensional figure element data denoting three-dimensional shapes of a plurality of figure elements of a solid figure in a figure element data storing section;

displaying the solid figure in a display screen according to the pieces of three-dimensional figure element data stored in the figure element data storing section;

displaying the measuring device in the display screen according to the pieces of three-dimensional structural data of the measuring device stored in a measuring device data storing section;

positioning the first constitutional element of the measuring device displayed in the display screen at a first point on the display screen while changing a piece of three-dimensional positional data stored in the measuring device data storing section;

extending or shortening the three-dimensional length of the measuring device to set the second constitutional element of the measuring device displayed in the display screen at a second point on the display screen while changing one or more pieces of three-dimensional length data stored in the measuring device data storing section;

calculating the three-dimensional length of the measuring device; and displaying the three-dimensional length of the measuring device in the display screen as a figure distance between a first figure element of the solid figure placed at the first point and a second figure element of the solid figure placed at the second point.

14. A method according to claim 13 in which the step of storing pieces of structural data includes the step of:

storing a piece of three-dimensional axial data denoting a locus of a connecting axis of which one end is connected to the first constitutional element and the other end is connected to the second constitutional element in the measuring device data storing section to display the connecting axis in the display screen in the step of displaying the measuring device, the step of extending or shortening the length of the measuring device including the step of:

extending or shortening the connecting axis to extend or shorten the three-dimensional length of the measuring device.

15. A method according to claim 14, additionally including the step of:

selecting a particular axial curvature agreeing with a curved outline of the solid figure from among a plurality of axial curvatures stored in the measuring device data storing section, the curved outline of the solid figure being curved in an arbitrary direction; and curving the connecting axis displayed in the display screen at the particular axial curvature to set the connecting axis in parallel with the curved outline of the solid figure, a curved length of the connecting axis being calculated in the step of calculating the three-dimensional length of the measuring device, and the curved length being displayed in the display screen as the figure distance in the step of displaying the three-dimensional length of the measuring device.

16. A method according to claim 15 in which the step of curving the connecting axis further includes the step of:

maintaining the first constitutional element of the measuring device in parallel to the second constitutional element of the measuring device.

17. A method according to claim 13, additionally including the step of:

rotating the measuring device displayed in the display screen around an arbitrary point on the display screen in a three-dimensional space to direct a measuring line defined by connecting the first and second constitutional elements of the measuring device in parallel with a measured line defined by connecting the first and second points on the display screen while changing one or more pieces of positional data stored in the step of storing pieces of structural data, the three-dimensional length of the measuring device rotated being extended or shortened in the step of extending or shortening.

18. A method according to claim 13 in which the step of positioning the first constitutional element includes the step of performing a translation movement for the measuring device in a three dimensional space to position the first constitutional element of the measuring device at the first point.

19. A method according to claim 13, additionally including the step of:

binding the first constitutional element of the measuring device to the first figure element of the solid figure placed nearest to the first constitutional element to assist in positioning the first constitutional element.

20. A method according to claim 13, additionally including the step of:

transforming the first and second constitutional elements of the measuring device displayed in the step of displaying the measuring device into a stick shape in a three-dimensional space; and binding the first constitutional element of the measuring device to an edge of the solid figure placed nearest to the first constitutional element to assist in positioning the first constitutional element, the edge of the solid figure being equivalent to the first figure element.

21. A method for measuring a figure distance in a three-dimensional space, comprising the steps of:

storing pieces of first structural data of a first measuring device which include a piece of first length data denoting a first length of the first measuring device and a piece of first positional data denoting a first position of the first measuring device in a measuring device data storing section, the first length of the first measuring device being represented by a first element distance between a first constitutional element of the first measuring device and a second constitutional element of the first measuring device;

storing pieces of figure element data denoting shapes of a plurality of figure elements of a solid figure in a figure element data storing section;

displaying the solid figure in a display screen according to the pieces of figure element data stored in the figure element data storing section;

displaying the first measuring device in the display screen according to the pieces of first structural data stored in the measuring device data storing section;

storing pieces of second structural data of a second measuring device composed of a piece of second length data denoting a second length of the second measuring device and a piece of second positional data denoting a second position of the second measuring device in the measuring device data storing section;

displaying the second measuring device in the display screen according to the pieces of second structural data stored in the measuring device data storing section to join the second measuring device to the first measuring device displayed in the step of displaying the first measuring device, the second length of the second measuring device being equal to a second element distance between the second constitutional element and a third constitutional element of the second measuring device;

positioning the first constitutional element of the first measuring device displayed in the display screen at a first point of the solid figure while changing positional data stored in the measuring device data storing section;

extending or shortening the first length of the first measuring device to set the second constitutional element of the first measuring device displayed in the display screen at a second point of the solid figure while changing the first length data stored in the measuring device data storing section;

extending or shortening the second length of the second measuring device to set the third constitutional element of the second measuring device at a third point of the solid figure;

calculating a summed length of the first length of the first measuring device and the second length of the second measuring device; and displaying the summed length in the display screen as a figure distance from the first point of the solid figure through the second point of the solid figure to the third point of the solid figure.

* * * * *